(12) United States Patent
Miller et al.

(10) Patent No.: US 12,337,491 B2
(45) Date of Patent: Jun. 24, 2025

(54) ADVANCED DEEP LEARNING HEALTH RELATED SENSOR INTEGRATION AND DATA ACQUISITION APPARATUS, METHOD, AND SYSTEM

(71) Applicant: Magnified AI, Inc., Palo Alto, CA (US)

(72) Inventors: David Kyle Miller, Washington, DC (US); William Lloyd Huston, Palo Alto, CA (US); James Lowell Ramsey Clarke, Washington, DC (US)

(73) Assignee: Forward Entertainment & Technology LLC, Washingtonm, DC (US)

( * ) Notice: Subject to any disclaimer, the term of this patent is extended or adjusted under 35 U.S.C. 154(b) by 973 days.

(21) Appl. No.: 16/443,878

(22) Filed: Jun. 18, 2019

(65) Prior Publication Data

US 2020/0397546 A1 Dec. 24, 2020
US 2022/0395359 A9 Dec. 15, 2022

Related U.S. Application Data

(63) Continuation-in-part of application No. 15/951,172, filed on Apr. 12, 2018, now Pat. No. 11,793,301.
(Continued)

(51) Int. Cl.
*H02N 15/02* (2006.01)
*A43B 3/34* (2022.01)
(Continued)

(52) U.S. Cl.
CPC .............. *B26B 19/388* (2013.01); *A43B 3/34* (2022.01); *A46B 15/0026* (2013.01);
(Continued)

(58) Field of Classification Search
CPC ........................... A61C 17/221; A61C 17/224
(Continued)

(56) References Cited

U.S. PATENT DOCUMENTS 4,795,347 A * 1/1989 Maurer .................. A61C 17/38
15/22.1
6,140,723 A * 10/2000 Matsui .................... B06B 1/045
15/22.4

(Continued)

*Primary Examiner* — Nghia M Doan
(74) *Attorney, Agent, or Firm* — Forward Entertainment & Technology; James Lowell Ramsey Clarke; Chiedo Raymond Ohanyerenwa

(57) ABSTRACT

The general field of the disclosure herein relates to the design of one or more health related monitoring or maintenance devices. These devices may include but are not limited to devices that monitor and/or maintain the health of users or devices that monitor and/or maintain the health of assets. The devices include oral cleaning devices for maintaining and monitoring the oral health of users, clothing for monitoring the health and fitness of users and charging pads which may monitor the health or assets being charged. Sensors may be integrated in these devices including but not limited to IMUs, thermocouples or oral cleaning devices, IMUs in clothing like shoes or wrist bands, or timers or charging sensors in magnetic surfaces which may cause one or more objects and/or other magnetic surfaces to float when a desired function is achieved.

12 Claims, 27 Drawing Sheets

Related U.S. Application Data

(60) Provisional application No. 62/484,870, filed on Apr. 12, 2017, provisional application No. 62/687,248, filed on Jun. 20, 2018.

(51) Int. Cl.
| | | |
|---|---|---|
| *A43B 7/00* | (2006.01) | |
| *A46B 15/00* | (2006.01) | |
| *A61C 17/22* | (2006.01) | |
| *B26B 19/38* | (2006.01) | |
| *B60L 53/12* | (2019.01) | |
| *G06N 3/08* | (2023.01) | |
| *H02J 7/00* | (2006.01) | |
| *H02N 15/00* | (2006.01) | |
| *H02J 50/10* | (2016.01) | |

(52) U.S. Cl.
CPC ............ *A61C 17/224* (2013.01); *B60L 53/12* (2019.02); *H02J 7/00* (2013.01); *H02J 7/0042* (2013.01); *H02N 15/00* (2013.01); *A43B 7/00* (2013.01); *G06N 3/08* (2013.01); *H02J 7/00034* (2020.01); *H02J 7/00302* (2020.01); *H02J 7/0049* (2020.01); *H02J 50/10* (2016.02)

(58) Field of Classification Search
USPC .......................................................... 320/114
See application file for complete search history.

(56) References Cited

U.S. PATENT DOCUMENTS

| | | | |
|---|---|---|---|
| 6,453,497 B1* | 9/2002 | Chiang | A61C 17/00 15/201 |
| 10,064,711 B1* | 9/2018 | Richter | A61C 17/221 |
| 10,512,529 B2* | 12/2019 | Wills | A61C 17/34 |
| 11,000,118 B2* | 5/2021 | Rivera | G08B 25/08 |
| 11,051,919 B2* | 7/2021 | Serval | A61C 17/34 |
| 2005/0272002 A1* | 12/2005 | Chenvainu | A61C 1/0084 601/162 |
| 2009/0291422 A1* | 11/2009 | Puurunen | A46B 15/0002 434/263 |
| 2012/0161698 A1* | 6/2012 | Anderson | H02J 7/00712 320/109 |
| 2017/0100223 A1* | 4/2017 | Silverberg | A61C 17/3445 |
| 2017/0238693 A1* | 8/2017 | Sissons | A46B 11/002 |
| 2017/0263149 A1* | 9/2017 | Sullivan | A46B 15/0004 |
| 2017/0318954 A1* | 11/2017 | Nishiura | A61C 17/22 |
| 2018/0021117 A1* | 1/2018 | Kitagawa | A61C 17/224 15/22.1 |
| 2018/0064516 A1* | 3/2018 | Wu | B22D 25/02 |
| 2018/0125623 A1* | 5/2018 | Serval | A46B 15/0002 |
| 2018/0271630 A1* | 9/2018 | Wills | A61C 17/3418 |
| 2018/0295979 A1* | 10/2018 | Miller | A61C 17/0202 |
| 2019/0200746 A1* | 7/2019 | Serval | A61C 17/225 |
| 2019/0278786 A1* | 9/2019 | Sherman | A46B 15/0038 |
| 2020/0179089 A1* | 6/2020 | Serval | A46B 15/0006 |
| 2020/0359777 A1* | 11/2020 | Pesach | A61C 17/34 |
| 2021/0085168 A1* | 3/2021 | Johnson | A61B 1/247 |
| 2021/0259401 A1* | 8/2021 | Rivera | A46B 15/0022 |
| 2021/0293473 A1* | 9/2021 | Beckman | F25D 25/02 |
| 2021/0315676 A1* | 10/2021 | Pai | A46D 3/005 |

\* cited by examiner

ADVANCED DEEP LEARNING HEALTH RELATED SENSOR INTEGRATION AND DATA ACQUISITION APPARATUS, METHOD, AND SYSTEM

CROSS-REFERENCE TO RELATED APPLICATIONS

The present application claims priority to U.S. Provisional Patent Application No. 62/687,248, filed Jun. 20, 2018. The entire disclosure of U.S. Provisional Patent Application No. 62/687,248 is incorporated herein by reference.

TECHNICAL FIELD

The general field of the disclosure herein relates to the design of one or more health related monitoring or maintenance devices. These devices may include but are not limited to devices that monitor and/or maintain the health of users or devices that monitor and/or maintain the health of assets. The devices include oral cleaning devices for maintaining and monitoring the oral health of users, clothing for monitoring the health and fitness of users and charging pads which may monitor the health or assets being charged. Sensors may be integrated in these devices including but not limited to IMUs, thermocouples or oral cleaning devices, IMUs in clothing like shoes or wrist bands, or timers or charging sensors in magnetic surfaces which may cause one or more objects and/or other magnetic surfaces to float when a desired function is achieved. Novel aspects of this invention are the design of the oral cleaning devices, sensor data integration system, or the levitation response system. In some exemplary embodiments the sensors may include Inertial Measurement Unit (IMU) sensor, a levitation system may respond to a mechanism, including but not limited to a timer, a proximity sensor or an electrical impulse. In some preferred embodiments of the present disclosure the invention the data gleamed from the sensors is integrated into an Artificial Intelligence, Machine Learning, or Deep Learning system which better informs the user of their decision making process with regard to their health, their use of the device the sensors are integrated into or the health of the asset being monitored. In some such embodiments the data monitored may be seamlessly shared with professionals at the user's discretion, including but not limited to one or more doctor's, dentists, or reliability engineers who are using an integrated application. In yet other embodiments sensors may be integrated into a device that exploits physical principles to create an electromagnetic field. In some other embodiments, a magnetic field is created to activate and/or regulate the force exerted between the device, and ultimately one or more objects that is on top off or adjacent to it. Other embodiments may involve directly applied mechanical means to dampen the force applied, including but not limited to springs, elastomers, or one or more motors that adjust the force applied in response to a sensor that detects one or more criteria, including but not limited to time, location, or the weight or type of object or device that is placed on top of it. In some exemplary embodiments the disclosed device may be a magnetic charging pad that causes an object, including but not limited to an electric toothbrush, a cell-phone, or an electric razor to levitate the moment said object achieves a certain charge. In some exemplary embodiments the utility of such levitation may be for display purposes. In other exemplary embodiments the utility of such levitation may be to prevent the object from overcharging. In other embodiments the device may be an electromagnet that causes another object to float the moment the electromagnet itself is fully charged. In certain preferred embodiments, such a device may have motors that cause the magnet and the floated device to rotate in tandem, lights moving in tandem or some combination.

BACKGROUND

The devices disclosed herein relate to utilizing sensors and data systems incorporating Artificial Intelligence (AI), Machine Learning (ML) or Deep Learning (DL) to enhance preventive maintenance techniques for user's health, oral health or asset health. In some such embodiments magnets may be used for force dampening, attraction, or repulsion. Legends regarding the discovery of magnetic properties by humanity contend that some 4,000 years ago a shepherd named Magnes in a region of Greece called Magnesia was walking when his metal tipped staff and the nails holding his shoes together became stuck to a black rock he was walking over. He found loadstones containing Fe3O4 which the Greeks labeled magnetite after the man, the region, or both. Early philosophers such as Pliny the Elder theorized magnetic stones contained magical powers and magnetite became shrouded in superstition. Chinese scholars developed a mariner's compass utilizing a loadstone splinter, carefully floated on the surface tension of water. Over time the magnetic attraction of Earth, the protection of the Magnetic sphere around similar celestial bodies and the ties between electricity and magnetism would all become discovered and magnets became utilized for attraction and repulsion, the function of computers, medical scanners and all sorts of electronics. (Jezek, Geno, ""Magnets Work", 2006, http://www.howmagnetswork.com/history.html, Read Apr. 26, 2018).

Magnetic Levitation has been used for a variety of purposes, including but not limited to floating trains so that they may move at high speeds in a relatively frictionless environments such as Japan's Shinkansen train line, for the purpose of propulsion such as in launching spacecraft or rail-gun systems, or to reduce the friction between parts or components such as a magnetic coupling between a pump and motor causing a motor to churn a pump without significant wear and tear on the shaft, coupling or associated components (Sarah Fecht, "8 Ways Magnetic Levitation Could Shape the Future", *Popular Mechanics*, Mar. 21, 2012).

One of the less discussed features of magnetic levitation seems to be its use for display purposes or conserving battery life. While permanent and electromagnets have been used to float objects in demonstration, the applicant are not aware of any such magnetic levitation devices which cause objects to raise without the direct input of the user. This presents opportunity for investment and exploration into some of the potential means of carrying out electromagnetic levitation without the direct input of the user and into some of the potential uses for electromagnetic levitation. Some of these potential means and uses include but are not limited to a timer that causes an electro-magnet to activate and float an object, an electro-magnet which activates when charged to a manufacturer defined, machine learning adjusted or user defined set point which may have the added benefit of preserving battery life of a rechargeable battery and avoids overcharging, or a motor or system of motors powering the rotation of an electromagnet that causes the electromagnet to spin once the electromagnet is charged sufficiently for the purpose of displaying a floated object to a user from multiple angles. These practical improvements could also provide the benefit of making a more attractive display for users than what is currently available. In some such exemplary embodiments a toothbrush with springs or magnetic dampers utilized to reduce force on the gumline may be the object that works in tandem with the disclosed device such that the magnetic field of the device guides the brush to clean the user's mouth. Utilizing AI, ML, or DL in conjunction with sensors to detect how well a user is moving, brushing, or managing their health is a relatively new concept, but advances in the field of clothing, health and dentistry go back thousands of years to the cradle of civilization.

Before toothbrushes, people used rough cloth and water to clean their teeth. They would also rub things like salt and chalk across their teeth to try to get rid of the grime. As long ago as 3000 BC, the ancient Egyptians constructed crude toothbrushes from twigs and leaves to clean their teeth. These sticks were rubbed against the teeth. The bristle toothbrush, similar to the type used today, was not invented until 1498 in China. The bristles were actually the stiff, coarse hairs taken from the back of a hog's neck and attached to handles made of bone or bamboo. The first documented toothbrush that closely resembles the ones typically used today was made in England in the 1770s. Records show that a man named William Addis came up with the idea while he was in prison, put there for having started a riot. He didn't think the rag he was given was cleaning his teeth well enough, so he saved a small bone from a meal. He put tiny holes in it and used glue to attach pig bristles he had gotten from a prison guard. The first patent for a toothbrush was awarded to an American named H. N. Wadsworth in 1857, but it wasn't until the invention of nylon in the 1930s that toothbrushes came to look like the ones you use. It wasn't until after World War II that Americans started brushing their teeth regularly. (Strauss, Valerie, Washington Post, "Ever Wondered How People Cleaned Their Teeth Before They Had Toothbrushes?", Apr. 13, 2009 http://www.washingtonpost.com/wp-dyn/content/article/2009/04/12/AR2009041202655.html Read Mar. 27, 2017)).

Since the 1930s, the tools and methods for cleaning one's teeth have remained relatively unchanged, while our knowledge of the importance of good oral hygiene has improved dramatically. While common practices such as brushing and flossing twice a day have been widely disseminated, a staggering number of elderly Americans suffer from diseases related to poor oral hygiene and many even require dentures later in their lives. Despite the advances in chronic, or acute, dental treatment, much more has to be done to address preventative measures, specifically how to improve oral hygiene leveraging tools and procedures that are used on a daily basis.

Recent forays into dental hygiene patents include vibration dampening toothbrushes (Cacka, Joe W., Chiles, Howell H., 2005, *Toothbrush*, Water Pik, Inc. (CO, US) U.S. Pat. No. 6,920,659; WO/2002/054906; 20020120991), toothbrushes with interchangeable parts (Jimenez, Eduardo J. et al., 2010, *Toothbrush*, Colgate-Palmolive Company (NY, US), EP2258307), manual toothbrushes designed to assist in evenly distributing the amount of force applied (Rauch, Samuel (NY, US), 1984, *Toothbrush*, U.S. Pat. No. 4,472,853), toothbrushes designed to be appealing for use by children ergonomically (Jimenez, Eduardo J. et al., 2010, Toothbrush, Colgate-Palmolive Company (NY, US), 20070050931), toothbrushes with flexible elements (Brown Jr., William R. et al., 2016, *Oral hygiene implements having flexible elements*, and methods of making the same, The Gillette Company (MA, US), U.S. Pat. No. 9,504,312), toothbrushes (manual or motorized) with indicator mechanisms that are notable by the user during use (Jungnickel, Uwe, Altmann, Niclas, 2016, *Oral hygiene implement*, Braun GmbH (Kronberg, DE), U.S. Pat. No. 9,439,740), and a force sensing oral care instrument that provides feedback to the user for self-adjustment (Jungnickel, Uwe, Altmann, Niclas, Guebler, Rene, 2014, Force sensing oral care instrument, Braun GmbH (Kronberg, DE), U.S. Pat. No. 8,832,895). None of these devices however deal with the automated regulation of pressure applied in cleaning of one's oral components, including but not limited to the teeth, gums, or tongue.

Embodiments of this device relating exclusively to toothbrushes will enable users to ensure that they are brushing in an optimal manner for the prescribed amount of time. The dampening mechanism implemented through means including but not limited to the use of a magnetic device, dampening pads, or springs will allow user to brush their teeth and gums longer with less abrasion and, as a result, less damage to tooth enamel and gums. This device through leveraging motion sensing software will allow user to ensure that they are adequately covering their entire mouths, as well as being reminded to use target areas that their dental professional have mentioned, and finally the ability to even to receive advice on best practice brushing methods via some web enabled application. These practical improvements could, individually, all rapidly improve oral health care, taken together they represent an advancement in the methods and practices used to maintain oral hygiene, However the most radical advancement is the decoupling of forces imparted by the user on their teeth, this device facilitates new and novel motions to transform what were once considered brushing mechanics into an ability to impart semi-autonomous motion to oral cavities and improve outcomes.

In exemplary embodiments involving the charging pad, the ability of device to impact the life of rechargeable batteries, alert users more quickly that an object is charged or provide a user with an attractive display that allows them to see an object from multiple angles at a certain point in time could provide a utility that make investment in the field of disclosure a potential boon to society that could further spur development with the aid of protection from intellectual property. Additional embodiments involve extending the health of one or more users or assets utilizing sensors or devices incorporating sensors to detect errors, AI, ML or DL predict the best means of correcting said errors or preventing further damage, and

SUMMARY OF THE INVENTION

This primary disclosure herein is an apparatus, method and system for one or more magnetic surfaces which may cause one or more objects and/or other magnetic surfaces to float when a desired function is achieved. A novel aspect of this invention is the response system. In some exemplary embodiments it may respond to a mechanism, including but not limited to a timer, a proximity sensor or an electrical impulse. In some preferred embodiments of the present disclosure the invention exploits physical principles to create an electromagnetic field. In such embodiments, a magnetic field is created to activate and/or regulate the force exerted between the device, and ultimately one or more objects that is on top off or adjacent to it. Other embodiments may involve directly applied mechanical means to dampen the force applied, including but not limited to springs, elastomers, or one or more motors that adjust the force applied in response to a sensor that detects one or more criteria, including but not limited to time, location, or the weight or type of object or device that is placed on top of it. In some exemplary embodiments the disclosed device may be a magnetic charging pad that causes an object, including but not limited to an electric toothbrush, a cell-phone, or an electric razor to levitate the moment said object achieves a certain charge. In some exemplary embodiments the utility of such levitation may be for display purposes. In other exemplary embodiments the utility of such levitation may be to prevent the object from overcharging. In other embodiments the device may be an electromagnet that causes another object to float the moment the electromagnet itself is fully charged. In certain preferred embodiments, such a device may have motors that cause the magnet and the floated device to rotate in tandem, lights moving in tandem or some combination.

The primary components of such embodiments of the device are a magnetic pad and an object comprising a wholly or partially magnetic surface. In all embodiments at least one of these components must be an electro magnet, and a magnetic field will exist between these two components when one or both of these components comprising an electromagnet is active. Another essential component to most embodiments of the present disclosure is a detection component which generates a response to activate the electromagnetic surface. In some such embodiments this detection component may be activated by means including but not limited to the magnetic pad also being a charging pad and the object being charged by the pad to a level that is preset to trigger the activation of the electromagnet on the magnetic pad, a timer that triggers the activation or deactivation of the magnetic pad or the object, or some combination therein. A current source and current regulating mechanism are required to generate and adjust magnetic flux in certain such embodiments. The magnetic field intensity is a function of that flux and material properties of the device. In some such embodiments the intensity of the magnetic field can be adjusted by means including but not limited to a dial located on the magnetic pad by changing the current in the circuit, which will select the power of the electromagnet, controlling the height at which the object is floated to, a switch to accomplish the same in increments, or a sensor that acts in response to the object being charged.

In certain embodiments the object may be charged by being tethered to the pad but trigger the pad's electromagnet to activate once a certain charge is reached. In other embodiments once a device is placed on the magnetic pad or tethered to it for a certain amount of time, the electromagnet in either the object, the pad or both may be activated to trigger the repulsion of the two devices. In yet other embodiments the object may rest on a magnetic holder which is repulsed from the magnetic pad once a certain response is achieved, including but not limited to the object resting in the holder for a certain amount of time, the object charging to a certain percentage, machine learning determining the type of object place on the holder, or human input.

Other embodiments of the present disclosure may involve rotating floated objects such as a cellphone which raises and rotates continuously 360 degrees when charged, including components such motors and gears to facilitate the turning of the magnetic pad which causes the repulsed object to rotate in tandem. Any of the above described embodiments may be varied in additional embodiments include charging mechanisms including but not limited to components for plugging them in, solar energy collection, rechargeable batteries that may be utilized with charging pads, replaceable batteries, or wireless charging mechanisms.

This disclosure is an apparatus and system for a magnetized oral hygiene device to be used regularly in order to standardize, optimize and monitor the efficacy of methods to improve oral hygiene, while minimizing the damage due to abrasion to improve oral health. Among the objectives of this disclosure are: to describe the embodiments of the invention sufficiently for someone of ordinary skill in the art to comprehend, to illustrate and describe the various embodiments and their components, including but not limited to an oral hygiene instrument holder with force dampening and/or force applying technology, a motorized semi-autonomous tooth scrolling oral cleaner, or a stationary, form-fitting oral cleansing device, and to provide related variations of a design that accomplishes the feat of decoupling forces imparted onto the cleaning device by the user from the forces that are transferred to the brush which contact the mouth during cleanings through various means of dampening including but not limited mechanical methods either compressible fluids, materials, springs, or use of magnetic fields, or any conceived autonomous methods for cleaning oral cavities without requiring any force to be imparted by the user, or any combination of the aforementioned.

The primary components of such embodiments of the device are the holder and the oral hygiene device; a magnetic field will exist between these two components. A current source and current regulating mechanism are required to generate and adjust magnetic flux in certain such embodiments. The magnetic field intensity is a function of that flux and material properties of the device. In some such embodiments the intensity of the magnetic field can be adjusted by means including but not limited to a dial located on the holder by changing the current in the circuit, which will select the pressure that can be exerted on a tooth for example, within an oral cavity, a switch to accomplish the same in increments, or a sensor that acts in response to the shape of the gum-line.

In certain embodiments during instances when the user applies a given force via the holder, that force cannot be imparted in the mouth until the magnetic field between the holder and the brush is overcome. In some such embodiments, the point at which the magnetic field is overcome is marked by contact between the brush and the holder. In some such embodiments, the brush and the holder will not be in contact when the user implies less force than required to overcome the selected force of the given magnetic field. In some such embodiments the strength of the magnetic field will determine how much force is imparted by the user into the mouth. In some certain such embodiments contact will initiate a gentle corrective vibration and/or a mild lighting indicator until the user reduces the force applied on the holder and as a result in the mouth and the two components lose contact. In other preferred embodiments, a control system will exist that counteracts the force of the user. In such embodiments, when a user applies a given force to the holder, the magnetic field will provide a force equal and opposite of the direction provided by the user, less the force necessary to generate the minimal amount of friction required to clean teeth. The counter-balancing effect ability of the control system allows the user a regular an unmodified force without ever exceeding the desired magnitude of force desired. In other such embodiments instead of the force applied by the magnetic field being less than or equal to the force applied by the user so as to generate the minimal amount of friction required to clean teeth, the user merely needs to move the oral hygiene device near to the mouth and the magnetic field will activate so as to apply the force needed to clean teeth, by means including but not limited to the user depressing a button, receiving an audio command from the user, or camera's on the unit designed to recognize the proximity of teeth. In some preferred embodiments the brush may be a motorized in order to achieve a full range of motion in which the response can be dampened, while also achieving enough rigidity to exert control and an amount of friction sufficient to clean teeth, the holder and the brush may be anchored together at their bases, via a universal joint, while still allowing a full 360 degree range of motion in one plane.

In other embodiments the apparatus may be an oral hygiene instrument holder (including but not limited to a toothbrush holder, floss pick holder, water flosser holder, or tongue cleanser holder) with an adjustable force dampening or force applying setting. In some such embodiments the force and or direction of the instrument held, and or the means of coupling the instrument to the holder, may include but are not limited to a clamping mechanism in some such embodiments utilizing a plurality of tongs attached to the holder to grasp the instrument, an elastic grasping mechanism utilizing one or more elastic mechanisms to twist and tighten around the instrument thus holding it in place and/or directing it, a magnetic coupling mechanism magnetically attaching itself to one or more magnets on the instrument allowing the holder to direct the instrument, and/or a screw in mechanism allowing the instrument to be screwed into the holder one of the two having a male connection component and the other a female.

Some other embodiments of the present disclosure may involve a motorized scrolling device which can scroll along the user's gum-line. In some such embodiments the motorized scrolling device may have a plurality of brushes which may utilize the force dampening and applying technology to clasp around the user's teeth as it scrolls back and forth along the row of teeth it is attached to. In certain embodiments the turning of certain brushes may allow the motorized scrolling device to move from one tooth to the next. In certain preferred embodiments the device may have a liquid containment chamber which may be utilized to apply a variety of pastes, gels or liquids to user, including but not limited to toothpaste, mouthwash, or peroxide whitening. In other such embodiments the motorized scrolling device may have a bar connecting one or more such devices, such that when a particular motor on the device turns, components including but not limited to gears, pulleys, or magnets will allow the device to propel itself along the bars as it scrolls along the user's gum-line. In certain preferred embodiments the scrolling device may further comprise a floss drawing system allowing the device to pull floss from one end of the device to another as it scrolls, such that as the device moves along the gum-line, clean floss may be drawn into an opening, and pushed into the gaps between the user's teeth by mechanisms including but not limited to a piston system, a hydraulic system, or an additional motorized system. In other embodiments the scrolling device may include an instrument for bacterial disinfection, including but not limited to an ultra violet light emitter, a bacteria inhibitor, or an ionic generator.

Other embodiments of the present disclosure may be stationary devices such as a mouth guard, including components such as those found in the scrolling device embodiments. These may include but are not limited to a scrolling brush cleaner which moves along the contours of the mouth guard, a plurality of brushes within the stationary device which may apply force sensing technology, an ionic or ultraviolet emitter, fluid chambers and spraying devices for mouthwash or tooth whitening applications floss scrolling and injection or similar oral cleansing mechanisms. Any of the above described embodiments may be varied in additional embodiments include charging mechanisms including but not limited to components for plugging them in, solar energy collection, rechargeable batteries that may be utilized with charging pads, replaceable batteries, or wireless charging mechanisms. Other variations may include wired or wireless transmission technology allowing a camera or programmed representation to display data including but not limited to a representation of the user's oral health, the force being applied, or the activity occurring in the user's mouth, on devices including but not limited to a cellular device, a television, or a wireless mirror.

Additional embodiments may involve data acquisition utilizing sensors including but not limited to cameras, temperature measuring device (including but not limited to thermometers, thermistors or thermocouples), timers, force detection, magnetic feedback detection, or position and velocity detection (including but not limited to inertial measurement unites (IMUs), gyroscopes or accelerometers). In some such embodiments a tooth efficacy clean AI algorithm may be utilized for means including but not limited to providing feedback for how well a user is cleaning their teeth, compare data between users, help one or more dentists to review information regarding users and/or make recommendations to users. In some such exemplary embodiments AI may be used to provide a standardized repeatable metric that will quantify the user's brushing habits in order to discuss with his or her dental professional. Tooth efficacy clean (TEC) is a work-based algorithm that measures how effective a user is brushing his or her mouth in real time. In some embodiments this algorithm only requires the following data points: position, time, and pressure, and when aggregated over time can be used to instantly provide feedback to the user and allow a dental professional to use artificial intelligence to assess whether the user has completed adequate cleaning since the last visit. These insights provide actionable recommendations as to how the well the user is cleaning and can improve their performance without damaging their gum-line, enamel and or other important oral health factors over time. In some other embodiments additional mechanisms may be utilized for the improvement of the toothbrush including but not limited to the aforementioned magnetic charger with a floating effect, an ultraviolet cleaner, or an internal dampening mechanism. An ideal embodiment may include but is not limited components such as a brushing stem with temperature, motion and/or pressure sensors, a removable brush head that slides over the stem and locks into place, a magnetic ring and base, one or more dampening pads or shock absorbers, a plastic modeled holder containing a battery, oscillator, data acquisition technology and/or gyroscope, an electromagnetic storage container, charger and ultra violet cleaner, and/or an application that can sync with the device via electromagnetic communication means including but not limited to wifi or bluetooth and display data on a GUI of a mobile device including but not limited to a cellphone, tablet or wireless mirror.

While the preferred embodiments of the disclosure are shown in the accompanying drawings, it to be understood that said embodiments are susceptible to modification and alteration while still maintaining the spirit of my invention.

BRIEF DESCRIPTION OF THE DRAWINGS

Referring to the drawings.

DETAILED DESCRIPTION

Figure 1:
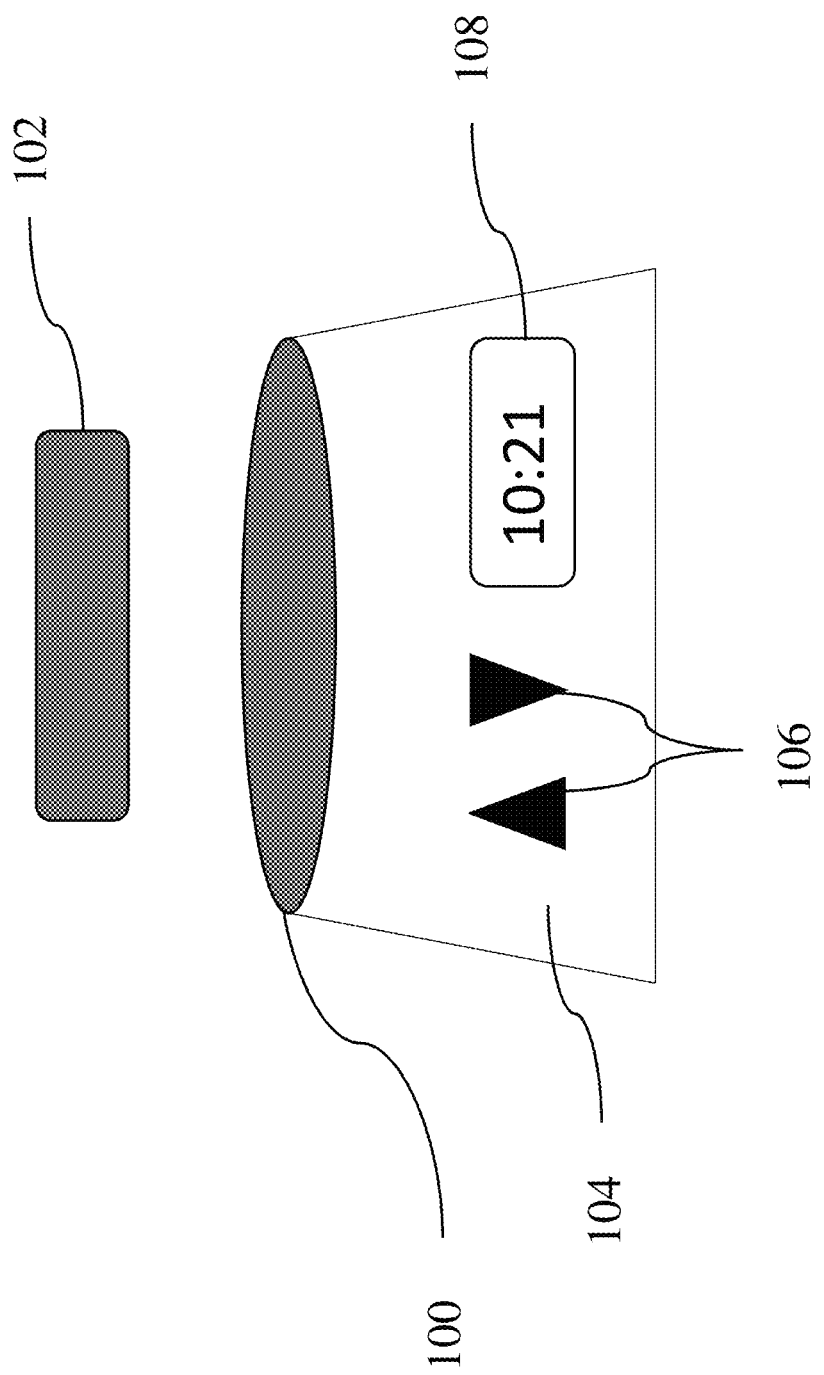
FIG. 1 is an illustration of an exemplary magnetic pad which operates on a timed basis for controlling levitation of an object in this case a cell phone.
Figure 2:
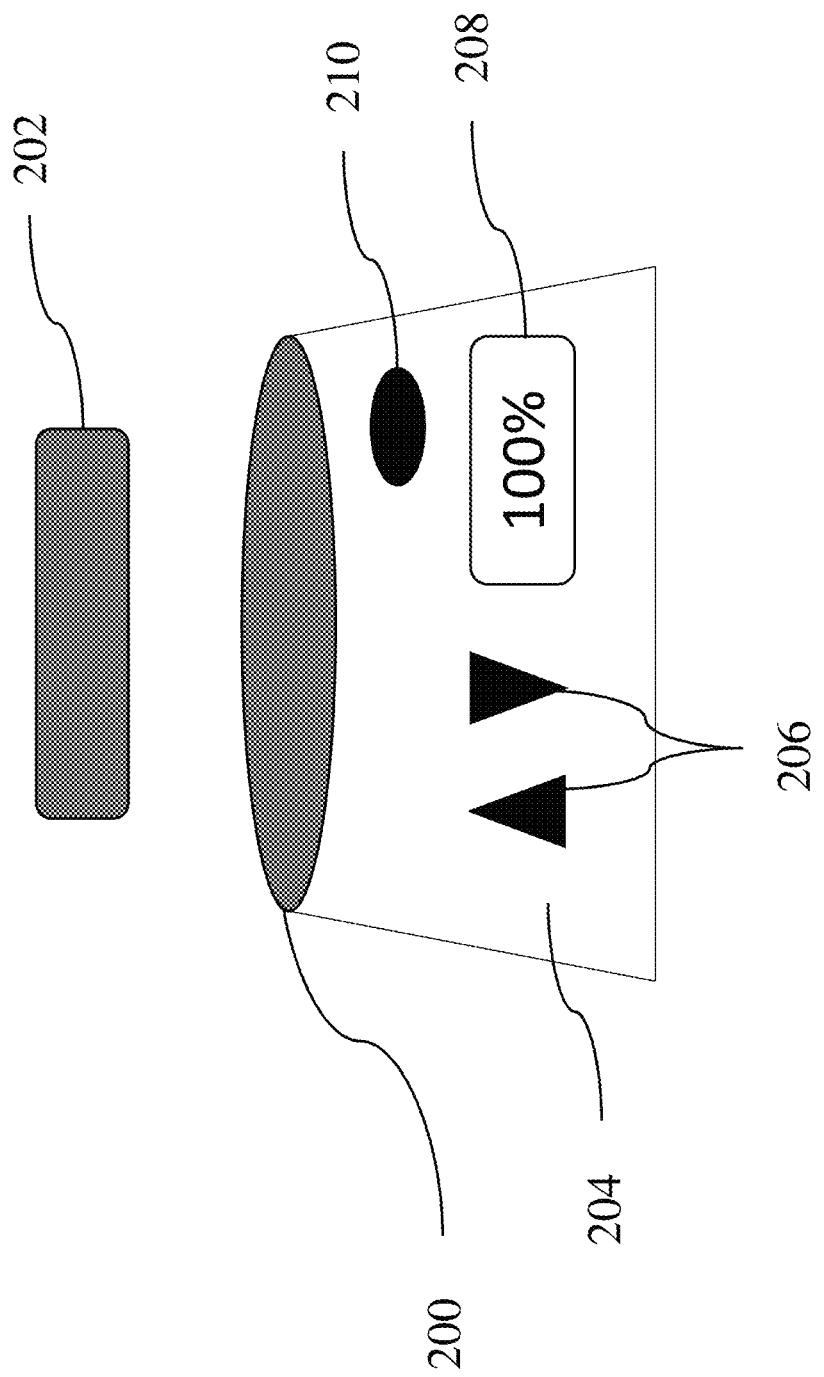
FIG. 2 is an illustration of an exemplary magnetic pad which operates on a percent charged basis for controlling levitation of an object in this case a cell phone.
Figure 3:
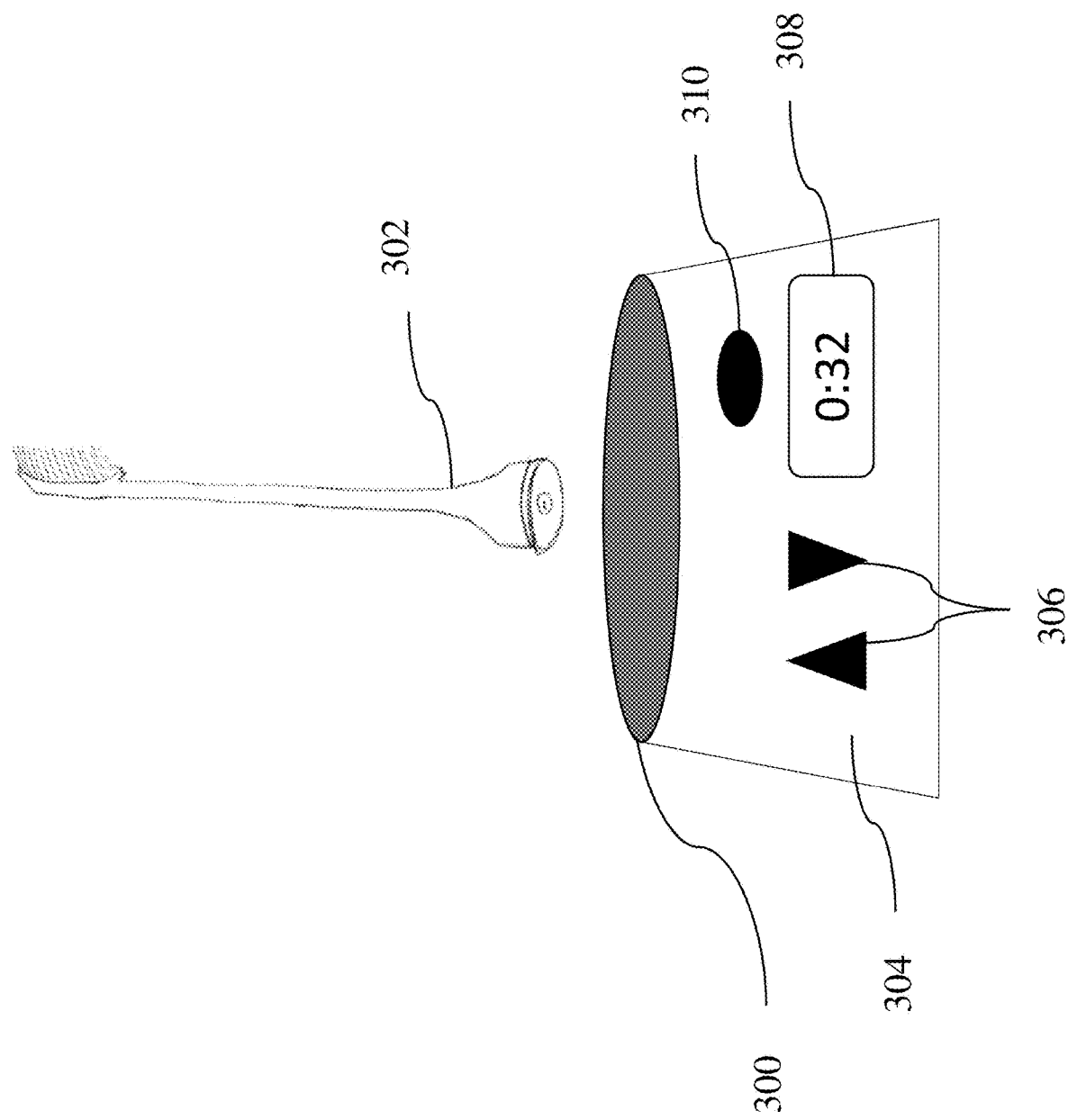
FIG. 3 is an illustration of an exemplary magnetic pad which operates on a timed basis for controlling levitation of an object in this case a toothbrush.
Figure 4:
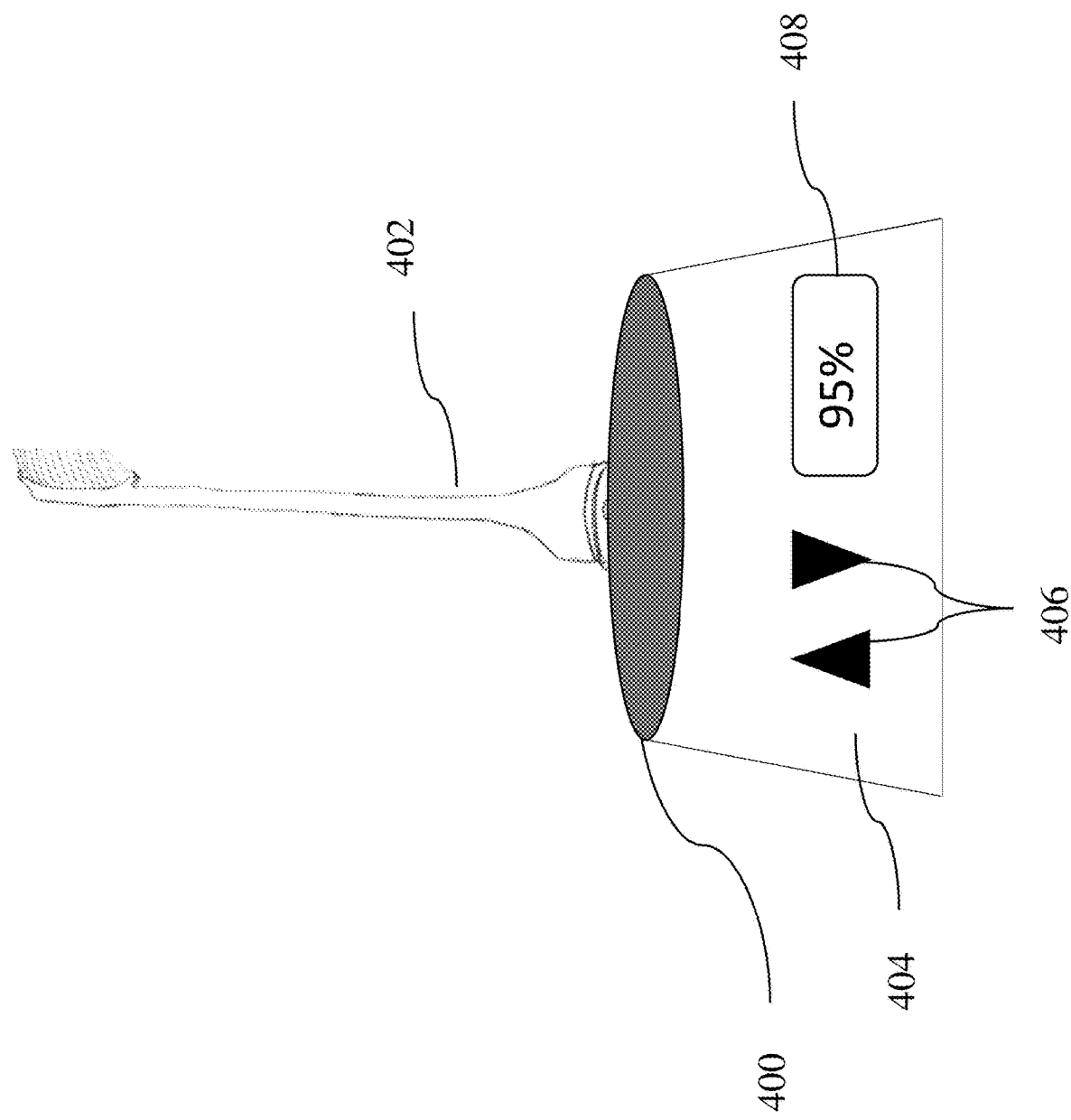
FIG. 4 is an illustration of an exemplary magnetic pad which operates on a percent charged basis before controlling levitation of an object in this case a toothbrush.
Figure 5:
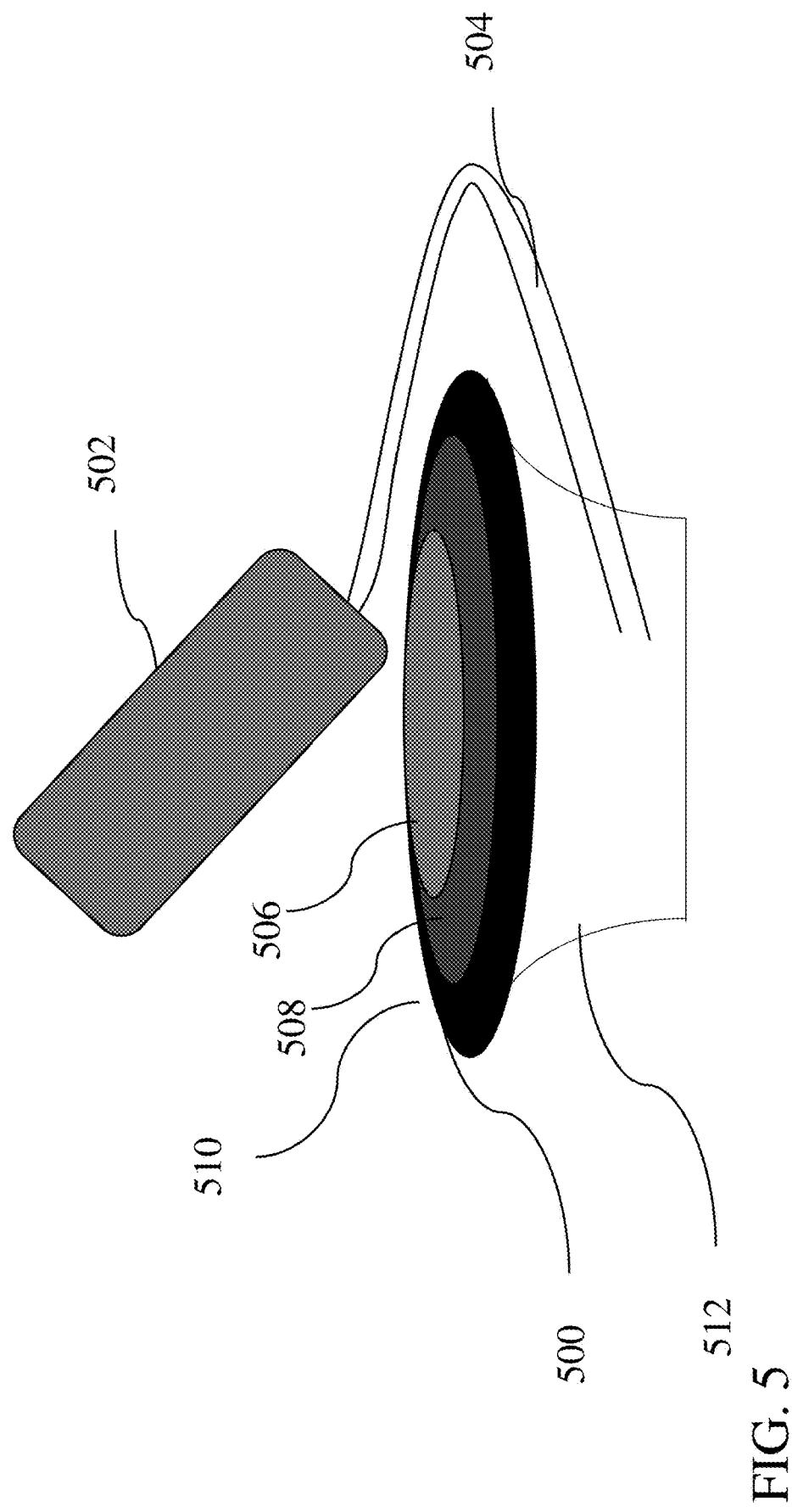
FIG. 5 shows a line drawing of a magnetic pad which is tethered to an object, in this case a cell phone, which it can continue to charge or not as desired while concentric magnetic rings can control the rotation of the cell phone at a desired angle.

In this disclosure the term 'oral hygiene device' refers to any device which may be used for the maintenance of a user's mouth, including but not limited to a toothbrush, a motorized toothbrush, a floss pick, a water flosser, a tongue scraper, a scrolling toothbrush, scrolling flosser, or a stationary mouth guard further comprising components including but not limited to motorized brushes, dental debris suction devices, bacteria removing cloth wipers, ionic emitting cleansers, ultraviolet light, liquid chambers and nozzles to spray mouthwash, peroxide tooth cleanser, toothpaste, or other oral cleansing liquid, gel, or paste, scrolling mechanism, or any combination of the aforementioned. In this disclosure, the term 'scrolling' refers to embodiments of the apparatus that involve mechanisms for moving devices along the gum-line. In the case of a scrolling toothbrush this may include a tooth-brush assembly of a plurality of brushes, which may be circular and motorized facing opposite angled or perpendicular directions and utilize the mechanical methods of propulsion including but not limited to the rotation of said brushes to move in some embodiments, a motor, wheel or pulley system along a track or mouth guard to move in others. In the case of a scrolling flosser or combination scrolling tooth-brush with a flosser the device may utilize the same means of propulsion as a scrolling tooth-brush, but comprise a component allowing a spool of floss to move from one side of the gum-line to the other, effectively allowing a fresh piece of floss to clean out one gap to the next as the floss moves in and out accomplished by mechanisms including but not limited to any combination of motorized pistons and spoolers, compressed gas driven pistons, hydraulic pistons, magnetic pistons, pulley driven spoolers or a single piece of floss held in a floss pick that gradually shifts from the front of the teeth gap to the back as it moves along the gum-line, and is replaceable. The scrolling flosser may be disassembled to allow a new spool of floss to be utilized in some embodiments. In some embodiments, the scrolling flosser may include a sensor that detects caps between the user's teeth and sends a signal to the scrolling mechanism to stop the floss there, press the floss into the user's gum until the desired pressure is achieved and retract the floss, restarting the scrolling to the next gap.

One feature shared by all embodiments of the disclosure is the dampening mechanism. The dampening mechanism may be as simple as means including but not limited to an adjustment mechanism for the scrolling toothbrush design that gives the parallel facing brushes enough play to glide along the user's teeth while applying enough pressure to adequately brush them utilizing means including but not limited to gears and clamps, moving in a limited range of motion, elastics or springs pressing the brushes with limited resistance into the user's teeth, a mouth guard device adjusting the pressure used by a suction device to pull bacteria from user's teeth, emit a jet of plaque removing liquid with regulated force, or any combination of the aforementioned to provide a limited present amount of pressure, or as complex as a magnetic oral hygiene device holder comprising a magnet stem which may be attached to the detachable base of a magnetic oral hygiene device such as toothbrush or tongue scraper with a magnetic base, said oral hygiene device further comprising a direction mechanism with a magnetic field adjuster which may be one of a variety of designs including but not limited to a dial adjusted mechanism directly attached to the oral hygiene device holder, a digital remote adjustment mechanism allowing the user to set the range of pressure applied, or a combination device involving a sensor in the attachment mechanism which sends a signal to the holder the moment resistance is detected and the holder responds by increasing the magnetic field in order to apply the desired pressure to teeth or gums that the oral hygiene device is touching. In some of the magnetic embodiments when a user applies a given force to the holder, the magnetic field will provide a force equal and opposite of the direction provided by the user, less the force necessary to generate the minimal amount of friction required to clean teeth. The counter-balancing effect ability of the control system allows the user a regular an unmodified force without ever exceeding the desired magnitude of force desired. In other such embodiments instead of the force applied by the magnetic field being less than or equal to the force applied by the user so as to generate the minimal amount of friction required to clean teeth, the user merely needs to move the oral hygiene device near to the mouth and the magnetic field will activate so as to apply the force needed to clean teeth, by means including but not limited to the user depressing a button, receiving an audio command from the user, or camera's on the unit designed to recognize the proximity of teeth. The attachment mechanism is a means of affixing the oral hygiene device holder to the oral hygiene device. The oral hygiene device holder may be shaped as one of several designs including but not limited to a tube, a platform, or a mouth guard. In some embodiments the attachment mechanism may be one of or any combination of the following including but not limited to a clamping mechanism in some such embodiments utilizing a plurality of tongs attached to the holder to grasp the instrument, an elastic grasping mechanism utilizing one or more elastic mechanisms to twist and tighten around the instrument thus holding it in place and/or directing it, a magnetic coupling mechanism magnetically attaching itself to one or more magnets on the instrument allowing the holder to direct the instrument, and/or a screw in mechanism allowing the instrument to be screwed into the holder one of the two having a male connection component and the other a female. In some embodiments, the oral hygiene device holder may be charged by means including but not limited to plugging the device directly into an outlet, in others it may be tethered by means including but not limited to a lightning cable, usb, or plug to an outlet, battery or charged device, or placing it on a charging pad, the device comprising a rechargeable battery compatible with said means in some such embodiments. In some embodiments, the disclosed device may include a motion sensor and/or a motion response mechanism allowing the device to autonomously react to motion within the user's oral cavity in means similar to the pressure dampening mechanism response, but which in some embodiments may also include adjusting the pressure applied by the device. In some such embodiments, the device may include a light and vibration pressure regulation mechanism, which may allow the device to adjust the amount of ultraviolet or visible light emitted, allowing the user to see and/or to neutralize bacteria harmed by ultraviolet radiation, or to regulate the pressure generated by the device vibrating as the user's mouth is cleaned. This may most easily be visualized in the mouth guard embodiments. In some such embodiments, the device may also include vibration and lighting indicators, allowing the device to autonomously respond in adjusting the light and vibration pressure regulation mechanism. In other embodiments the device may comprise a web enabled device that transmits or records data associated with usage. This may allow the device to send a signal showing data including but not limited to a camera showing the users mouth or a representation of the users mouth, health data concerning the users mouth, or data related to the performance of the oral hygiene device, and transmitting it an output device including but not limited to a cellular phone, tablet, television, computer, virtual reality glasses, augmented reality glasses, or a smart mirror my means including but not limited to bluetooth, wifi, or usb. In some embodiments the device may be a scrolling brush containing components such as a timer allowing it to keep track of how much time is spent on each tooth, a top scroller allowing it to scroll along the top and bottom teeth simultaneously, or further comprising a scrolling mechanism capable of adjusting the displacement between top and bottom rows of teeth brushes so that one of the scrolling brushes moves laterally as both move horizontally adjusting for the difference in lateral space between the top and bottom teeth as the scrolling brushes move. These adjustments may be made by means including but not limited to malleable wires, gaps on a track directed by wheels, or a string that both brushes move along while attached to one another via elastic bands.

Additional exemplary embodiments include data acquisition utilizing sensors including but not limited to camera devices, thermometers, timers, force detection, magnetic feedback detection, accelerometers or position and velocity detection. Some such embodiments involving camera devices may utilize camera devices including but not limited to pinhole cameras in the brush head, borescope cameras above the brush head, or photoelectric sensors, which may be used for means including but not limited to spotting damage in a user's mouth, comparing user's teeth overtime, comparing users cleaning efficiency vs other users, taking scans of a user's mouth for review by one or more dentists, or spotting and preventing gum disease, plaque buildup or visual indications that a user is getting sick. In some such embodiments a tooth efficacy clean AI algorithm may be utilized for means including but not limited to providing feedback for how well a user is cleaning their teeth, compare data between users, help one or more dentists to review information regarding users and/or make recommendations to users. The tooth efficacy clean AI may involve some form of machine learning in some such embodiments for means including but not limited to gathering data from multiple users, comparing data from one user over time or some combination therein. Some such embodiments may involve an external app with a GUI that compares users performance to other users for competitive purposes. In some other embodiments additional mechanisms may be utilized for the improvement of the toothbrush including but not limited to the aforementioned magnetic charger with a floating effect, an ultraviolet cleaner, or an internal dampening mechanism. In some exemplary embodiments a magnetic charger with a floating effect may involve a charging stand for a brush that can use the repulsion of the magnetic charging surface to cause the brush to float, as an oppositely charged surface pushes off of an activated electromagnetic charger. In some such exemplary embodiments a brush may be dropped by a user and floated by the charger before the electromagnet powers down to lower the brush automatically onto the charger. An ideal embodiment may include but is not limited components such as a brushing stem with temperature, motion and/or pressure sensors, a removable brush head that slides over the stem and locks into place, a magnetic ring and base, one or more dampening pads or shock absorbers, a plastic modeled holder containing a battery, oscillator, data acquisition technology and/or gyroscope, an electromagnetic storage container, charger and ultra violet cleaner, and/or an application that can sync with the device via electromagnetic communication means including but not limited to wifi sensors, blue-tooth sensors or other electromagnetic communications device and display data on a GUI of a mobile device including but not limited to a cellphone, tablet or wireless mirror.

In this disclosure the term 'electro-magnetic surface' refers to any device comprising one or more electro-magnets, permanent magnets, wireless charging pad or some combination therein, one or more may be activated by means including but not limited to an electric charge, release/movement of a magnetic shield, or electromagnetic pulse. In this disclosure, the term 'object' refers to one or more devices which may be levitated or charged by the electro-magnetic surface, including but not limited to a toothbrush, cell-phone, car, cell phone case with magnetic shielding to protect the cell phones components, cell phone holder which may be charged by the electro-magnetic surface such that it can activate an additional electro-magnet to move a brush from its holder or a host of other exemplary embodiments. Some exemplary embodiments of the present disclosure may be as simple as an electro-magnetic surface which raises a repelled magnetic pad with a company logo on it and spins it around or puts lights on it, or as complex as an electro-magnetic surface which is embedded in a roadway such that it can charge a vehicle including but not limited to an electric car, hydraulic-electric cart or solar-electric aircraft's battery while using a system of magnets and receptors to detect balance of the vehicle on the roadway and provide feedback to the vehicle dashboard regarding issues including but not limited to alignment issues, structural damage, or suitable aerodynamic enhancements to improve performance.

Some exemplary embodiments of the present disclosure may include but are not limited to a magnetic pad that has a wired connection to a floating object. In some such embodiments the wired connection would be used for means including but not limited to charging the object, serving as a tether to the object, guiding the spin of the object along a pathway the tethered line moves across, or some combination therein. Some such embodiments may include the use of an electromagnetic tether. Some such embodiments may allow for some movement of the object including but not limited to circular motion, tumbling, or raising/lowering in response to criteria including but not limited to the object reaching a certain charge, the object being placed on the magnetic pad for a certain amount of time, or a user inputting a command. Other embodiments of the present disclosure may comprise an object that charges while flat on a wireless charger. In some such embodiments the wireless charger may comprise two or more fields at least one for magnetic levitation of an object and at least one other for charging an object. In some such embodiments said fields may not operate simultaneously. Some such embodiments may utilize electromagnetic means of communication including but not limited to Bluetooth, Wifi, or NFC bands. In some such embodiments the magnetic pad may respond to a controller to switch between the modes including but not limited to imbedded controls, a remote controller, or application controls that may be directed by an application with a GUI on from a cellphone and allow users to select or input commands including but not limited to selecting that the object hovers when it has finished charging, that the charging pad implements machine learning, that the object charges via tether as opposed to utilizing a charging pad, or that the object spins at a certain rate. Yet other embodiments of the present disclosure may allow a wireless charging and magnetic pad device to activate both fields without any adverse interference allowing charging and levitation at some pre-defined distance. In some such embodiments the rate of charging may be slower when the object is levitating than when it is sitting on the magnetic pad. In some such embodiments a setting may be labeled any number of items including but not limited to responsive wave, night charging, or auto-float and may raise the object from the pad being able to allow a user to access it more quickly. In some such embodiments this mode may function by causing the object to raise in response to user motion including but not limited to the moment a user waves their hand, reaches for the object or is in close proximity to the object, allowing the user to grab the object more easily instead of fumbling for it. In some such embodiments the magnetic field may make adjustments automatically guide the object to it's resting place or ideal charging place the moment the user lowers the object onto the charging pad.

In some embodiments of the disclosure the apparatus may be a magnetic pad 100 which levitates an object of opposing polarity, in this case a cellphone 102. The magnetic pad may further comprise a base 104, with room for buttons 106 to adjust a timer 108 which may control how long an object begins to float after it is detected in some embodiments or how long an object floats for in others. In certain embodiments, the cellphone may have a holder which comprises a permanent or electromagnet, in order to repel the electromagnet of the base magnet when activated, while providing shielding to the cell phone in some embodiments. In some embodiments, the base may serve as a charging pad and the timer can be set to cause the object to levitate after charging for a certain amount of time.

In some embodiments of the disclosure a magnetic pad 200 may levitate an object of opposing polarity, in this case a cellphone 202, and may further comprise a base, 204 with buttons 206 to adjust the desired maximum charge displayed 208 and a button to set or activate the electromagnet 210, causing the object to levitate once the desired charge is detected.

In some other embodiments of the disclosure the apparatus may be a magnetic pad 300 which levitates an object of opposing polarity, in this case a toothbrush with a magnetic base 302. The magnetic pad may further comprise a base 304, with room for buttons 306 to adjust a timer 308 which may control how long an object begins to float after it is detected in some embodiments or how long an object floats for in others. A button 310 may be used to change the mode in some exemplary embodiments for means including but not limited to activating such that the toothbrush will lift at desired points in the day to remind a user when to brush, detecting when the brush has sufficiently charged before lifting, or sensing the brush performance and lift it when it is suggesting to replace the brush.

In some embodiments of the disclosure a magnetic pad 400 may levitate an object of opposing polarity, in this case a toothbrush 402, and may further comprise a base, 404 with buttons 406 to adjust the desired maximum charge displayed 408 causing the object to eventually levitate once the desired charge is detected.

In yet other embodiments of the disclosure a magnetic pad, 500, may levitate an object in this case a cell phone, 502, which is powered via a tethered connection, 504, and rotated or angled by concentric magnetic rings, 506, 508, and 510, supported by a base, 512.

Figure 6:
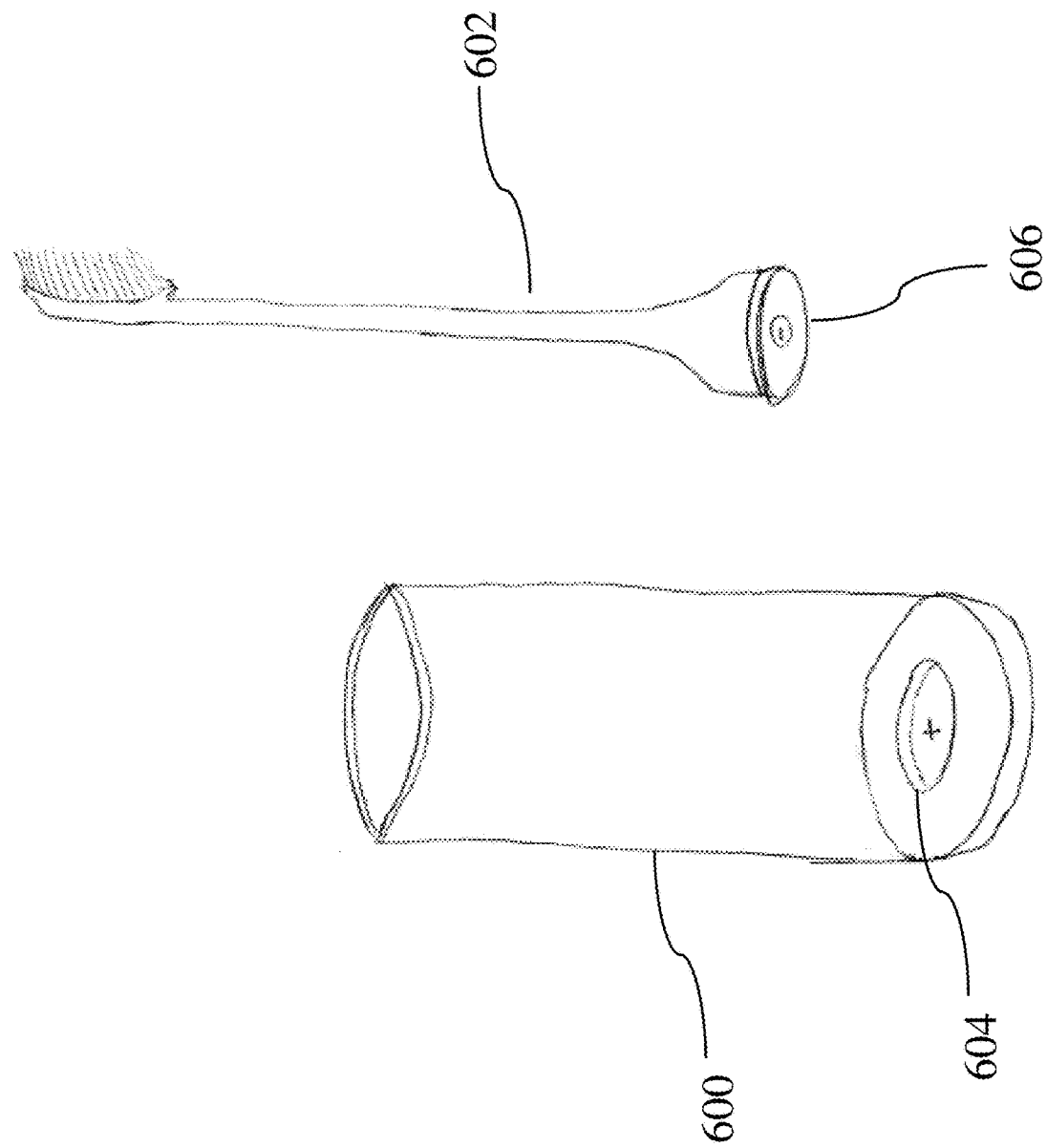
FIG. 6 illustrates a line drawing of an object and holder with a magnetic connector between the two, in this case the object being a toothbrush, where the holder may act as the magnetic pad and attract or repel the toothbrush.

FIG. 6, illustrates an oral hygiene device holder 600, separate from an oral hygiene device, in this case a brush, 602, which may be attached to or levitated from the holder at a magnetic linkage, 604, matching a magnetic attachment on the brush, 606, the magnetic assembly allowing for force dampening as the user cleans their teeth.

Figure 7:
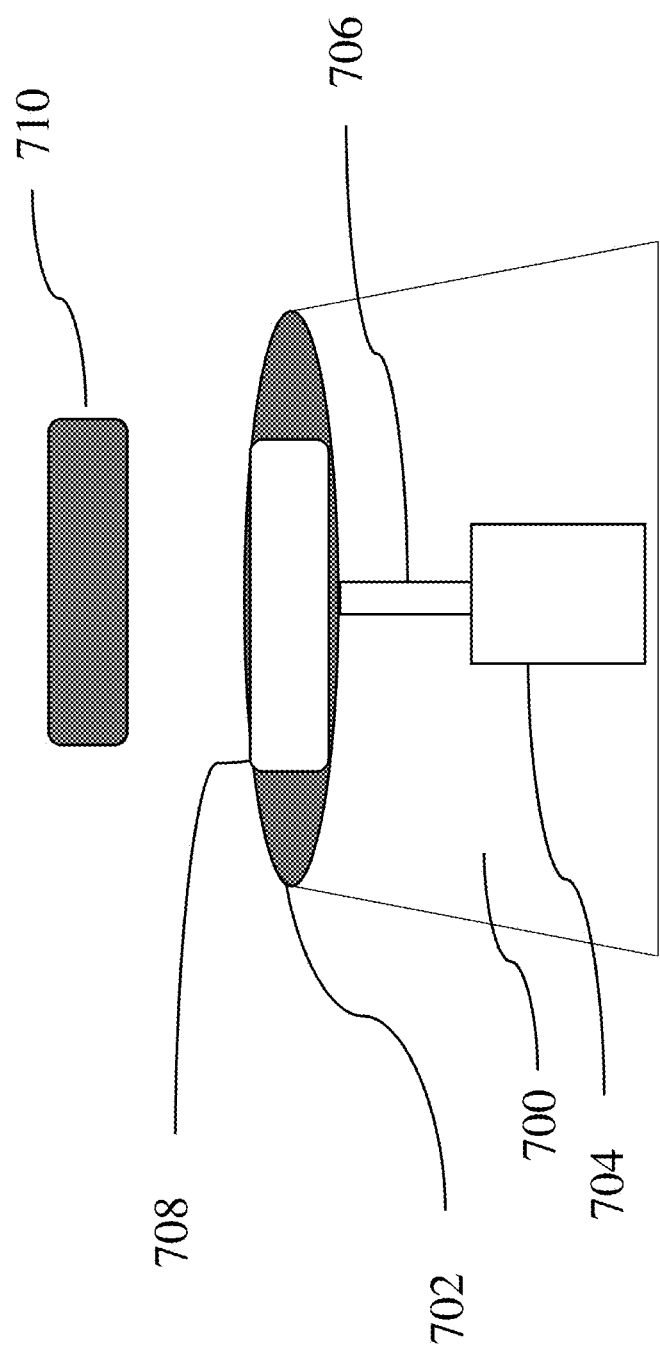
FIG. 7 is an illustration of an exemplary magnetic charging pad which operates on a timed basis for controlling levitation of an object in this case a cell phone and has a motor for rotating the magnetic pad and in tandem the floated object.

FIG. 7, illustrates a magnetic charging pad assembly 700, comprising a magnetic charging pad, 702, which may be turned by a motor 704, rotating a connected stem 706, the magnetic pad containing a slot 708 which may be utilized to house an object, in this case a cell phone 710, or cause it to rotate in tandem.

Figure 8:
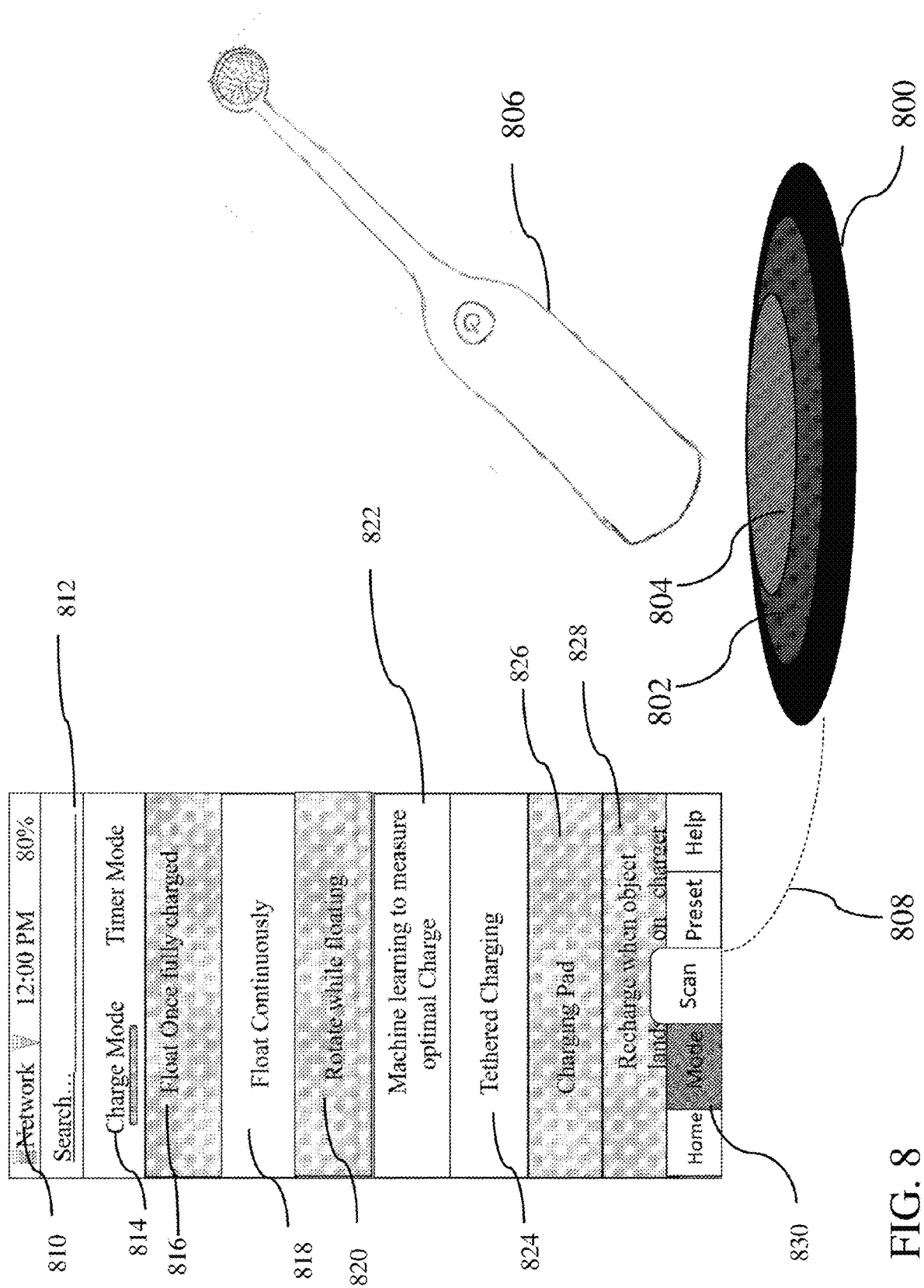
FIG. 8 shows a line drawing of a magnetic charging pad which levitates a charged object, in this case a motorized toothbrush, which it can float at an angle or not as desired while concentric magnetic rings can control the rotation of the toothbrush, all controlled from the GUI of an illustrated app.

FIG. 8, illustrates a magnetic pad, 800 which may levitate an object in this case a toothbrush, 502, which is powered via a charging pad when it is not levitating, 804, and rotated or angled by concentric magnetic rings, 802. The assembly may be controlled wirelessly 808 by a user's GUI application 810, which allows the user to set whether the apparatus operates on a timer mode 812 or a charge mode 814. This application may give the user options such as setting whether the object is to be floated once fully charged 816, floated continuously 818, rotated while floating 820, whether the device should record data and act on it via machine learning to adjust how it floats the object to achieve a more optimal charge based on battery life and rechargeability 822, whether it should charge the object via tethered charging 824 as opposed to using the charging pad 826, and whether it should recharge the object when it lands on the charger or not 828. In this exemplary embodiment there are also options to change the menu on the GUI as the mode 830 menu is currently selected in the illustration.

Figure 9:
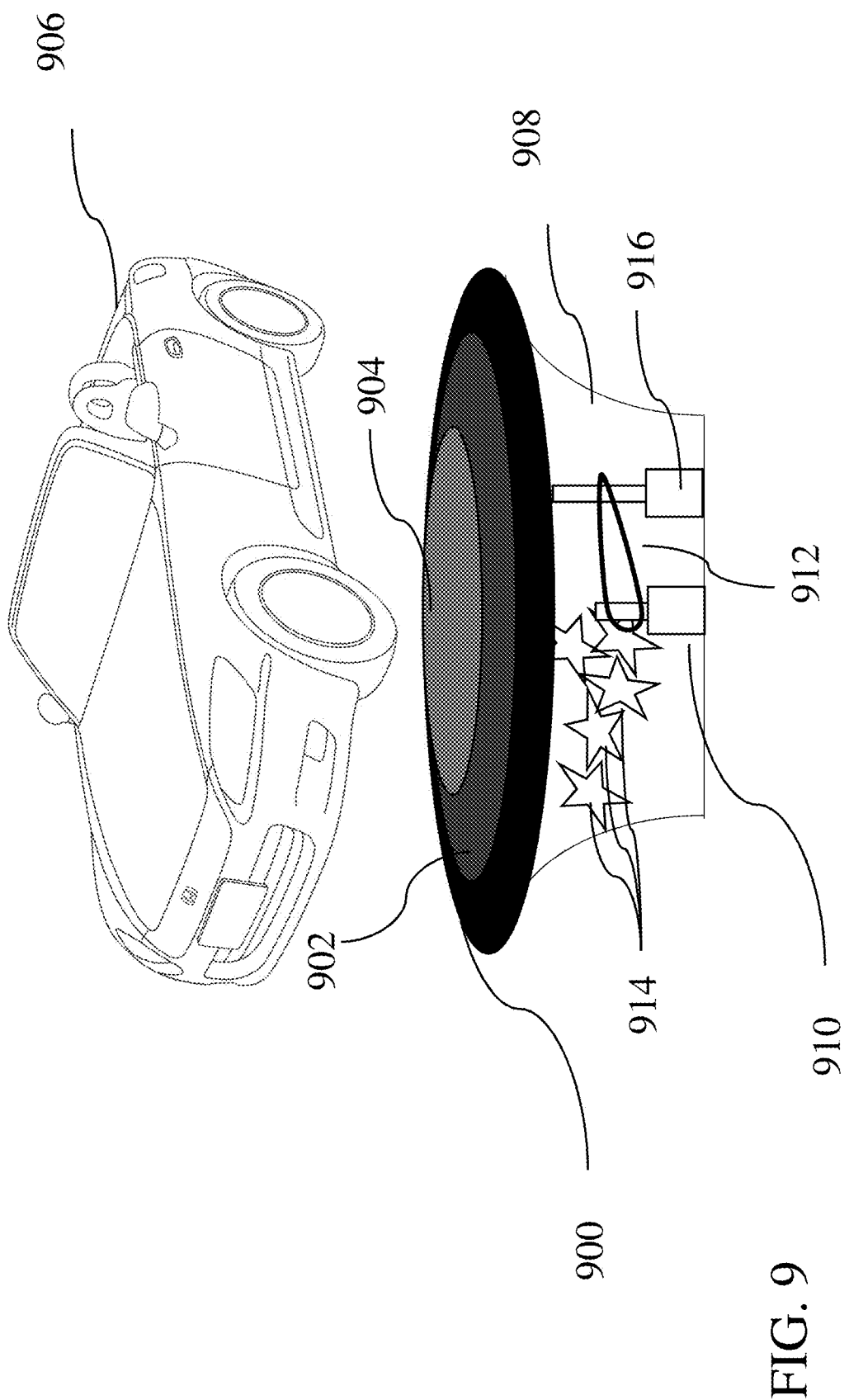
FIG. 9 illustrates a line drawing of a magnetic charging pad which levitates a charged object, in this case an electric car, which it can showcase with lights from the outermost ring or not as desired while concentric magnetic rings can control the rotation of the car as desired, all controlled a system of motors, gears and pulleys.

FIG. 9 illustrates a line drawing of a magnetic charging pad 900 which levitates a charged object, in this case an electric car 906, which it can showcase with lights from the outermost ring or not as desired while concentric magnetic rings 902, 904 can control the rotation of the car as desired, all controlled a system of motors 910, 916, gears 914 and pulleys 912, within the base housing 908.

Figure 10:
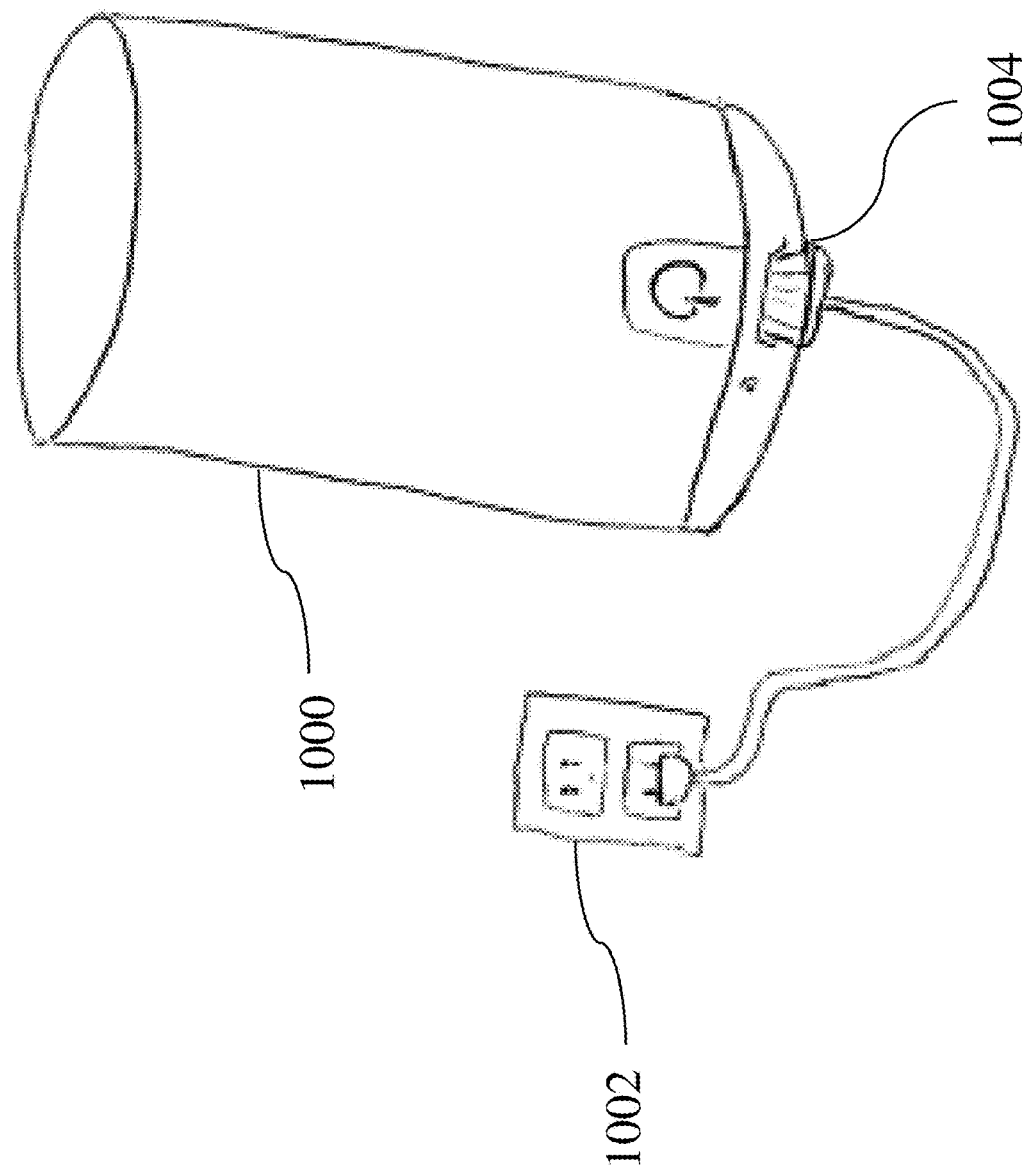
FIG. 10 illustrates a line drawing of a magnetic charging pad, in this case being an oral hygiene device which can levitate an object in this case the device being a motorized toothbrush which operates on principles of magnetic dampening to control force from a brush head using said dampening technology, as the charging pad is tethered two an outlet for charging.

FIG. 10 illustrates a line drawing of a magnetic charging pad 1000, in this case being an oral hygiene device which can levitate an object in this case the device being a motorized toothbrush which operates on principles of magnetic dampening to control force from a brush head using said dampening technology, as the charging pad is tethered 1004 to an outlet 1002 for charging.

Figure 11:
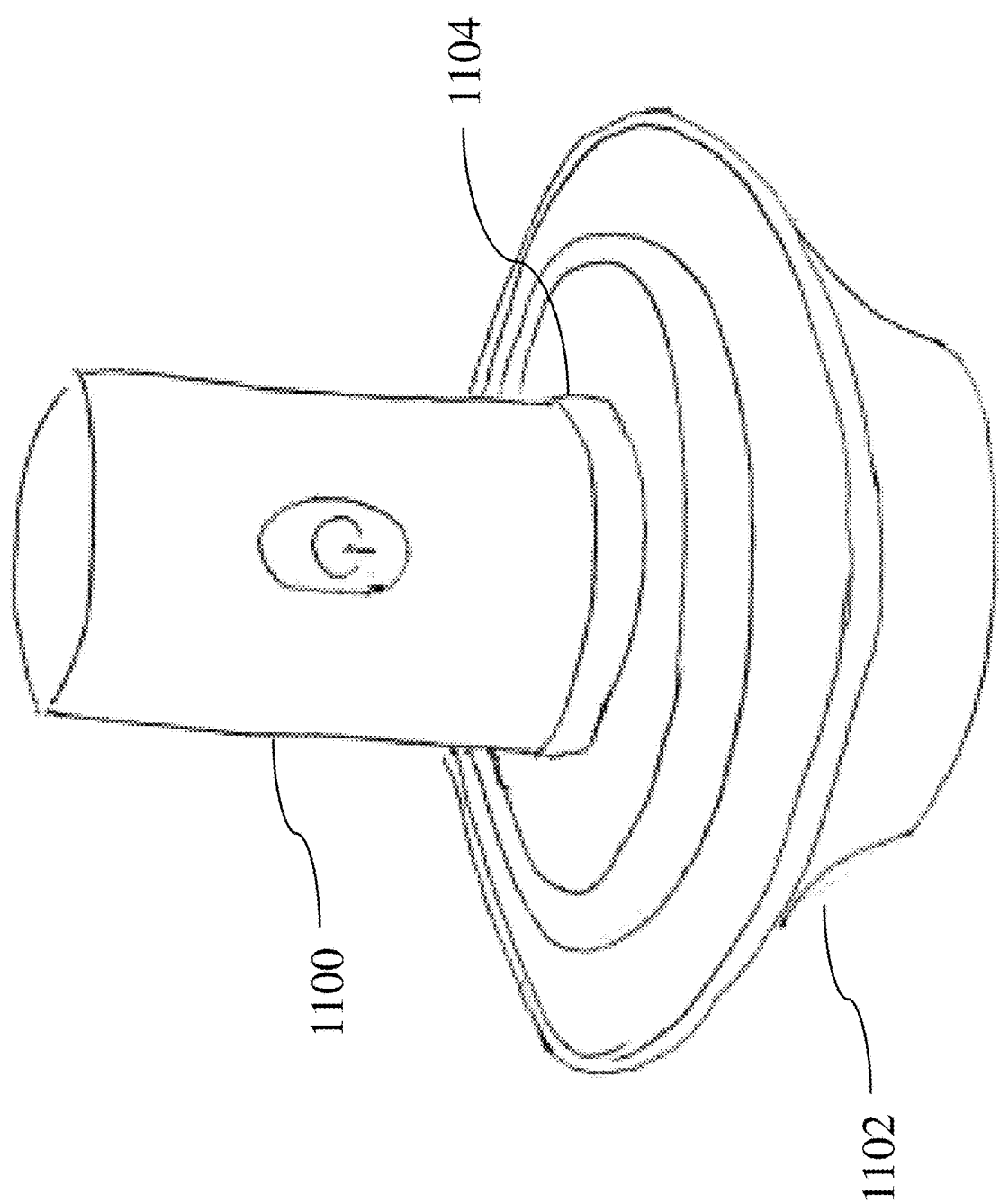
FIG. 11 illustrates a line drawing of one charging pad, in this case an oral hygiene holder, with a chargeable battery, sitting on a charging pad for recharging said battery.

FIG. 11 illustrates a line drawing of one charging pad 1100, in this case an oral hygiene holder, with a chargeable battery 1104, sitting on a charging pad 1102 for recharging said battery.

Figure 12:
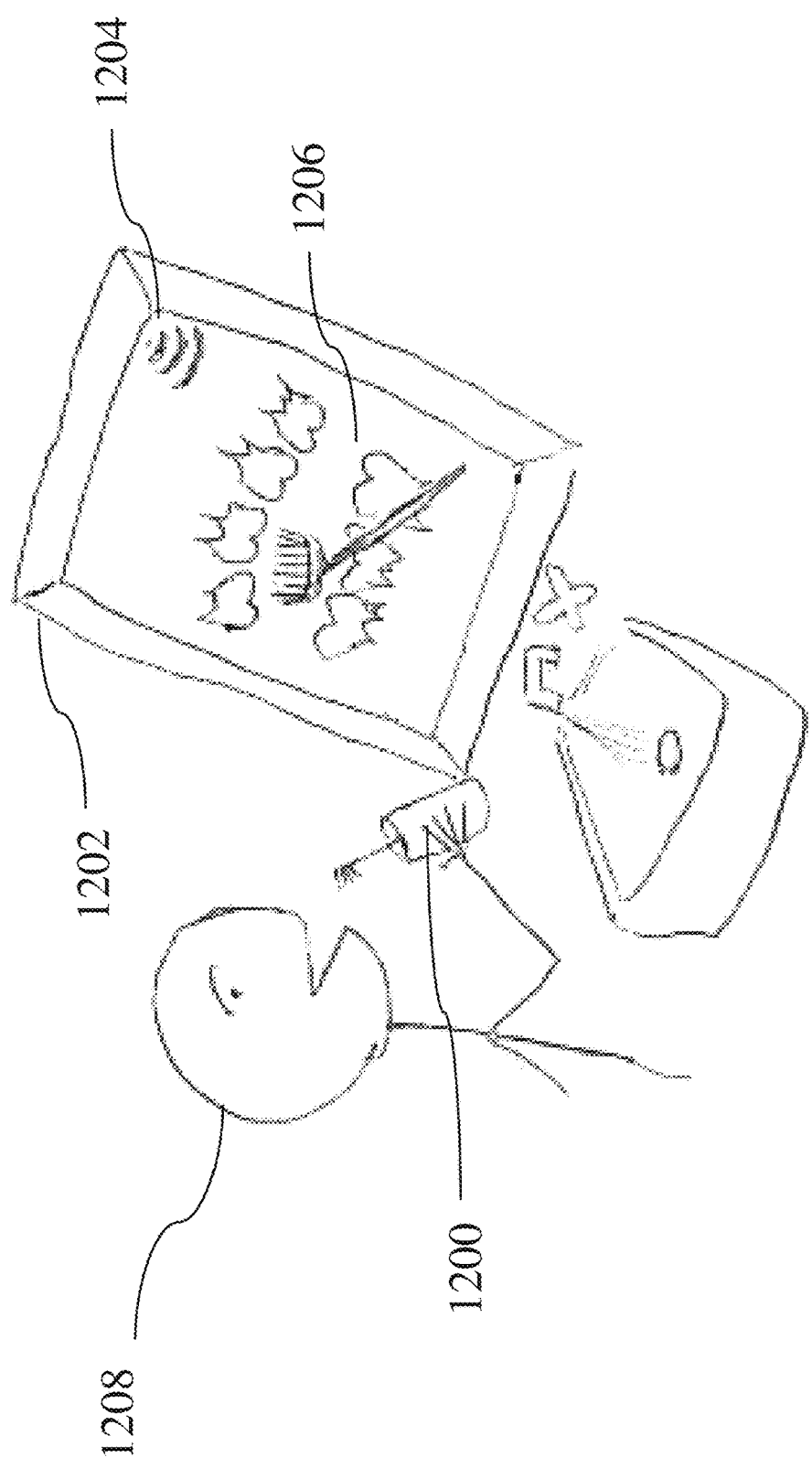
FIG. 12 illustrates a line drawing of an oral hygiene holder with a chargeable battery for controlling the movement of a repulsed magnetic toothbrush, or for controlling the transmission of a signal wirelessly displaying data related to a user's use of the device, in this case a representation of cleaning their teeth being displayed on a wifi/display enabled monitor.

FIG. 12 illustrates a line drawing of an oral hygiene holder with a chargeable battery for controlling the movement of a repulsed magnetic toothbrush 1200, or for controlling the transmission of a signal wirelessly to a display device, in this case a wireless local area network or bluetooth enabled mirror 1202, which may display a symbol to indicate a connection has been established, in this case a wi-fi symbol, 1204, as it displays data related to the user's oral health or the device condition, in this case camera footage of the user's mouth as it's cleaned, 1206, as the user, 1208, holds the oral hygiene device.

Figure 13:
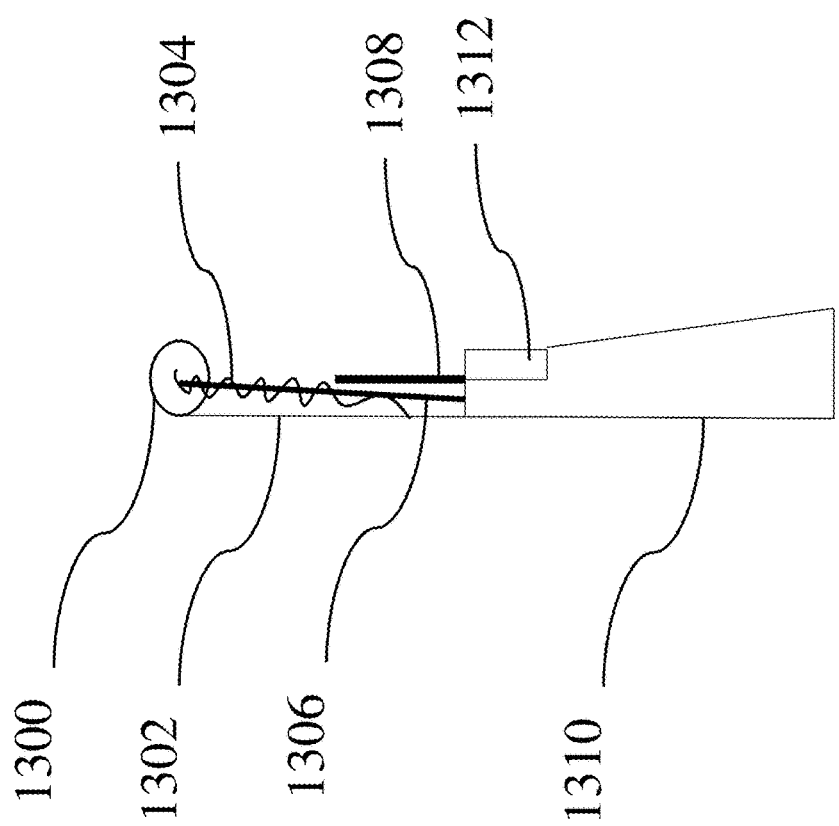
FIG. 13 is a representation of an oral device regulated by an oscillation mechanism at the stem of the holder, wherein a spring provides the dampening force and the brush head is given rigidity due to a dampening bar.

FIG. 13 illustrates a representation of an oral device 1310 regulated by a oscillation mechanism 1308 at the base of the stem holder 1312, wherein a spring 1304 provides the dampening force around a brush stem 1306 and the brush head 1308 is given rigidity due to a dampening bar 1302.

Figure 14:
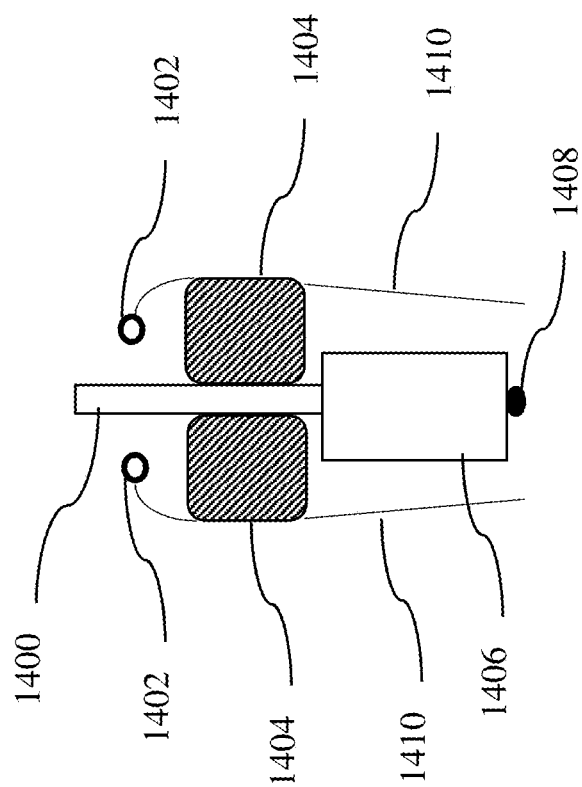
FIG. 14 is a cross sectional representation of an oral device regulated by an oscillation mechanism at the stem of the brush, wherein dampening pads on either side of the brush stem are used to provide a safety factor to the user.

FIG. 14 illustrates a cross sectional representation of an oral device 1410 regulated by a oscillation mechanism 1406 with an oscillation pivot point 1408 at the stem of the brush, wherein dampening pads 1404 on either side of the brush stem 1400 are used to provide a safety factor to the user as magnets 1402 can guide the direction of the brush head.

Figure 15:
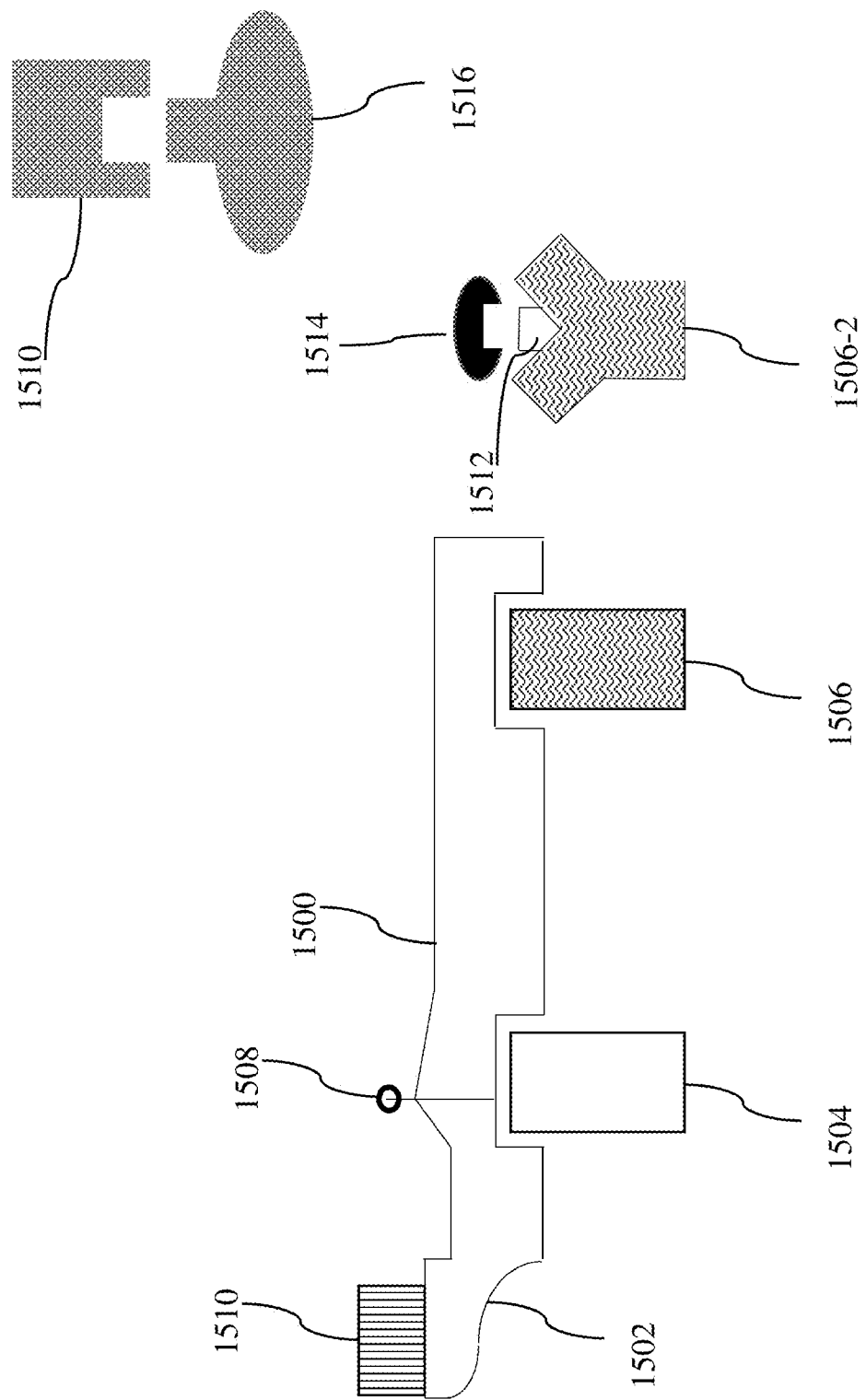
FIG. 15 is a side view representation of an oral device and holder which may act as a charging pad with some magnetic components.

FIG. 15 illustrates a side view representation of an oral device 1500 and holder 1504 which may act as a charging station 1506 (or 1506-2 as seen from the side view) with some magnetic components 1512, 1516 which cause the oral device to lift a fitting part of the oral device 1510, 1514 as a brush head 1510 and stem 1502 may be guided by magnets 1508.

Figure 16:
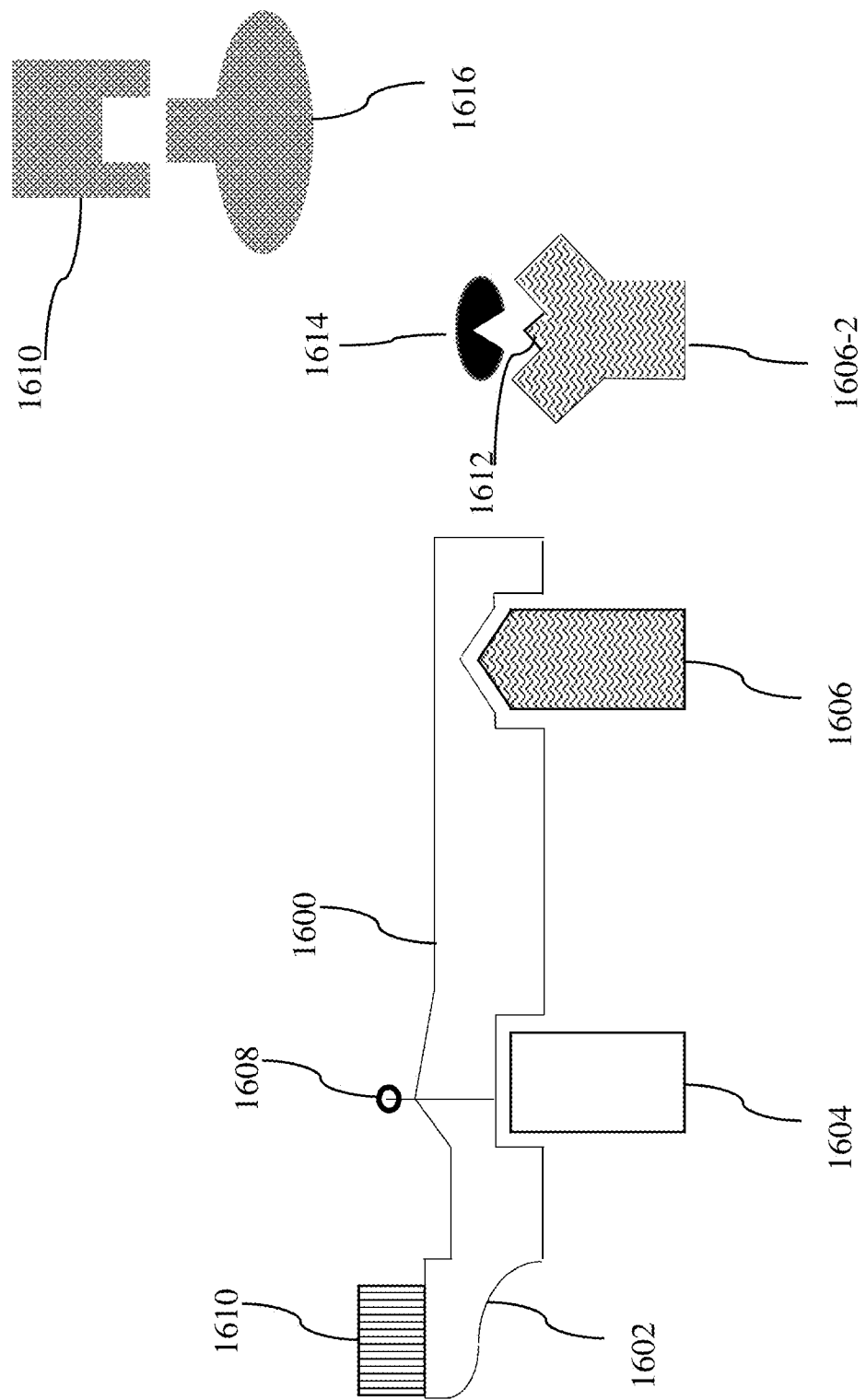
FIG. 16 is a side view representation of an oral device and holder which may act as a charging pad with some magnetic components.

FIG. 16 illustrates a side view representation of an oral device 1600 and holder 1604 which may act as a charging station 1606 (or 1606-2 as seen from the side view) with some magnetic components 1612, 1616 which cause the oral device to lift a fitting part of the oral device 1610, 1614 as a brush head 1610 and stem 1602 may be guided by magnets 1608.

Figure 17:
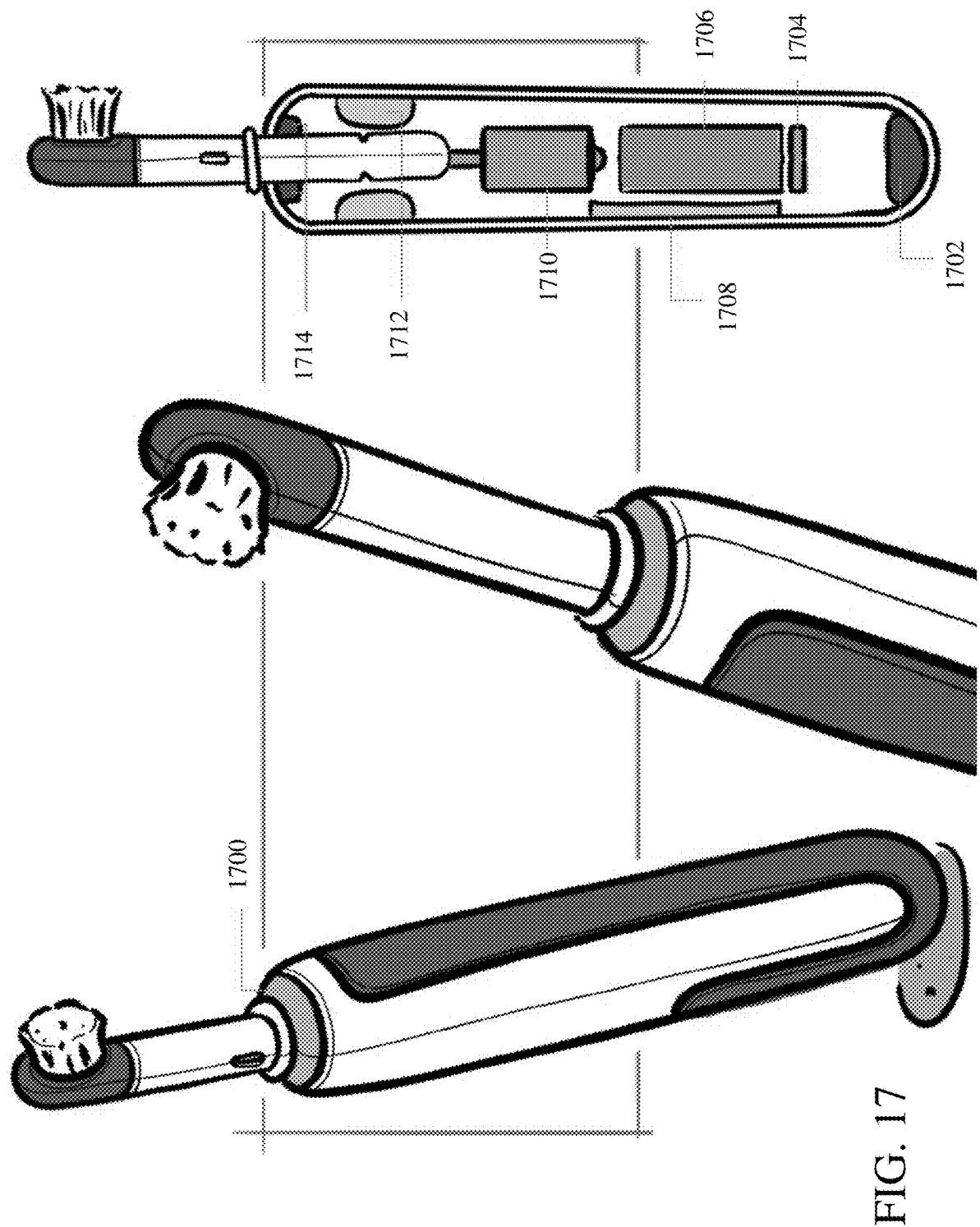
FIG. 17 is an orthogonal and a cross sectional representation of an oral device regulated by an oscillation mechanism, with dampeners, bluetooth and various other features.

FIG. 17 illustrates an orthogonal and a cross sectional representation of an oral device 1700, with magnetic components 1702 for lifting from a charger, Bluetooth components 1704 for communication, a battery 1706 for powering the device, a charging module 1708 for charging the device, an oscillator 1710 for regulating the motion of the stem, dampers 1712 for reducing the force placed on the stem, or magnets to guide the brush head 1714.

Figure 18:
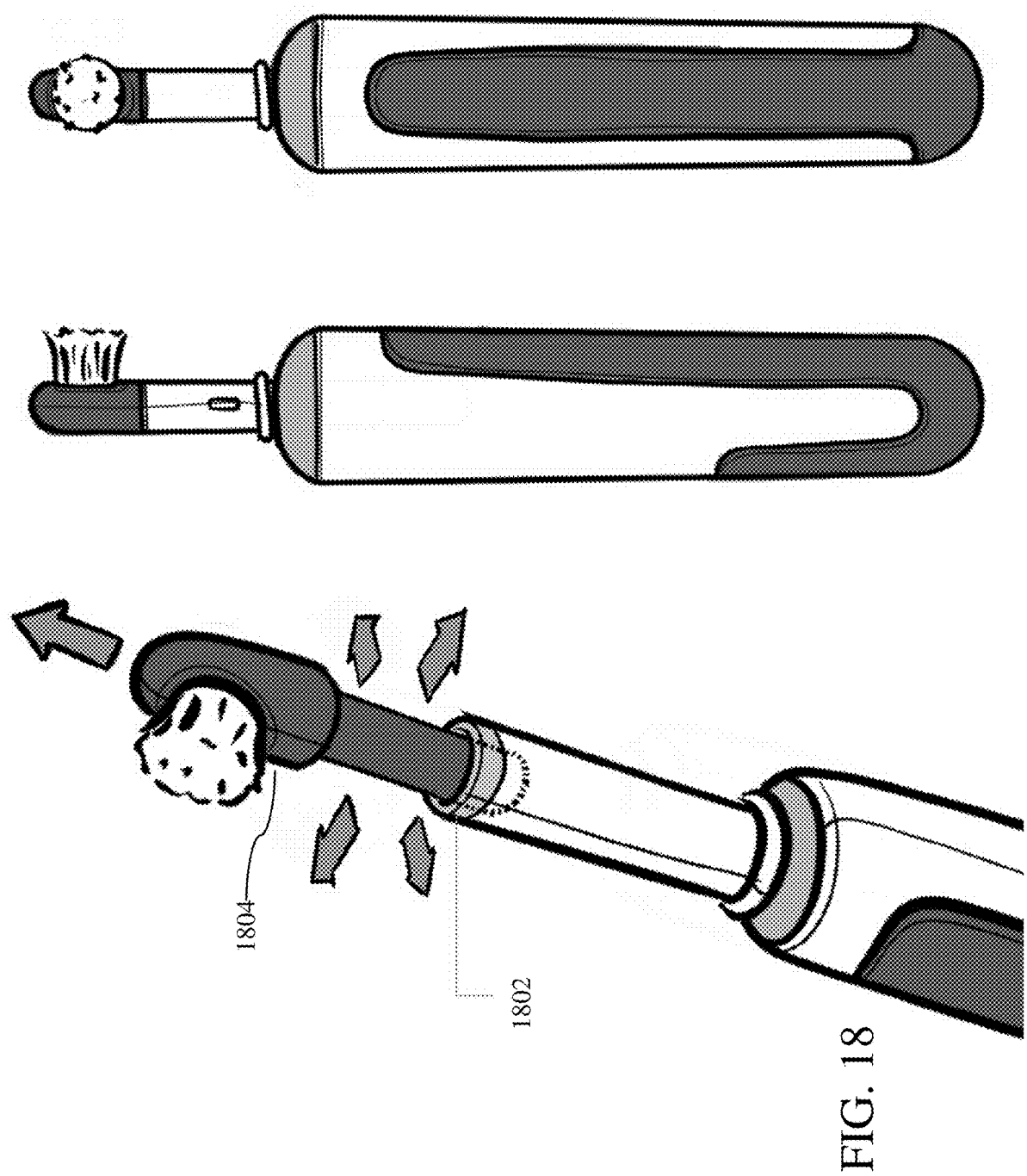
FIG. 18 is an orthogonal and a front and side representation of an oral device regulated by an oscillation mechanism, with a removable brush head which may have 360-degree mobility, sensors built in or various other features.

FIG. 18 illustrates an orthogonal and a front and side representation of an oral device regulated by an oscillation mechanism, with a removable brush head 1804 which may have 360-degree mobility, sensors built in 1802 or various other features.

Figure 19:
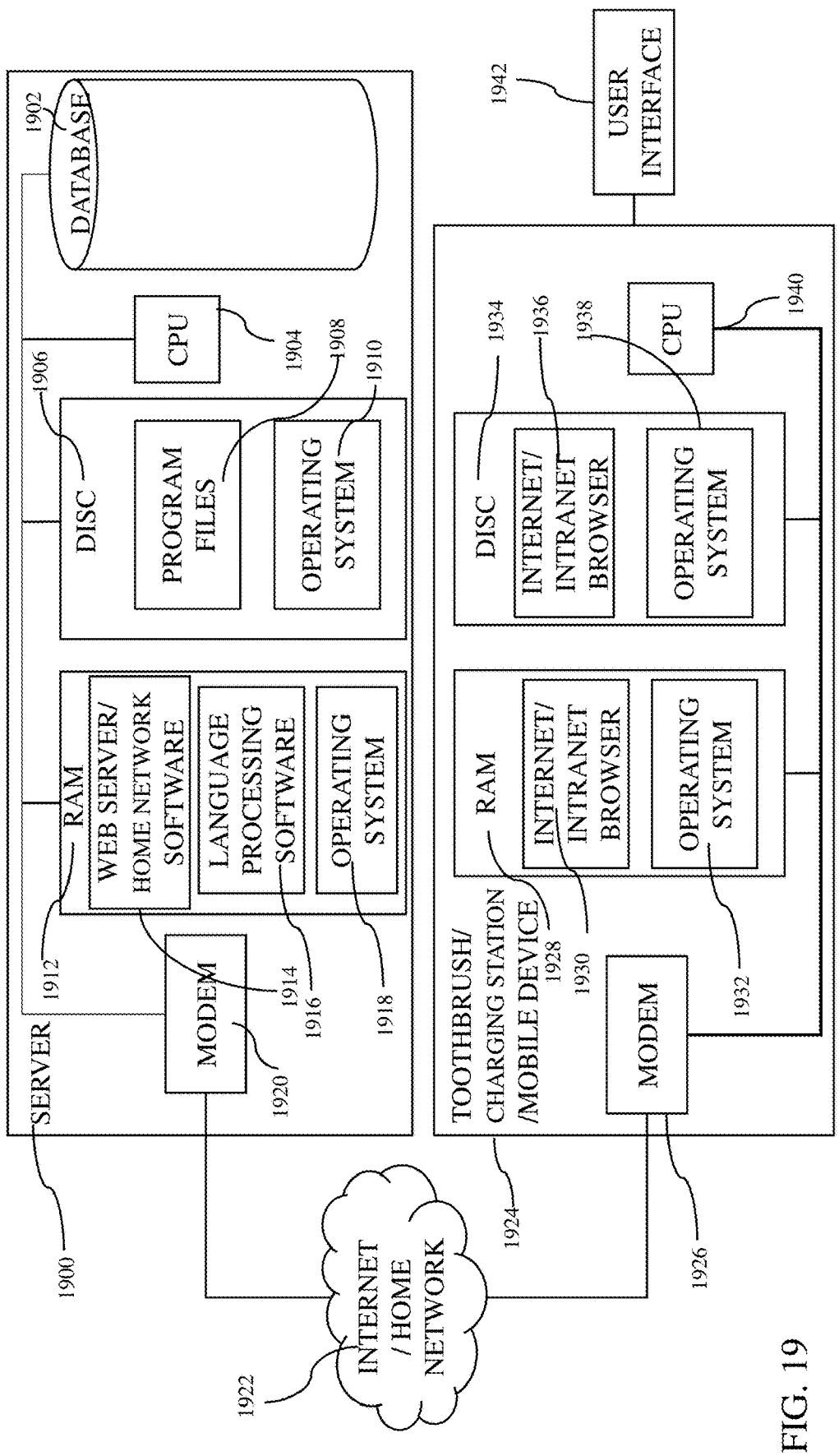
FIG. 19 is an exemplary flowchart showing the typical database hierarchy with data sent to and from a device including but not limited to a charging station, toothbrush or mobile device using an application which may process a variety of functions including but not limited to vocal commands, language translation, responses, ordering of replacement parts, scheduling dentist appointments, or letting a user know how well they or any family members in their home network database or in competition with them on a cloud database are performing functions including but not limited to cleaning their teeth or replacing their brush components.

FIG. 19 is an exemplary embodiment following a standard Internet architecture in which one or more user's toothbrush/charging station/mobile device 1924 and a server 1900 are connected via the internet/home network 1922 and modems 1926, 1920 or other communications channels. A user accesses the server 1900 via their toothbrush/charging station/mobile device 1924 potentially via verbal commands operating a web browser 1930 or other software application residing in RAM memory 1908 that allows it to display information downloaded from a server 1900. The server system 1900 runs server software 1914, including the inventory loading software 1916 of the present invention, which interacts with the toothbrush/charging station/mobile device 1924 and a user information database 1902. The database 1902 contains contact information entered by registered users. The language processing software 1916 in some situations will process a user's verbal commands by acting in means including but not limited to pulling information from the database 1902 adding information to it, sending information back to the device such it can respond verbally to the user in language they will understand. Both the server 1900 and the docking station/mobile device 1924 include respective storage devices, such as hard disks 1906 and 1934 and operate under the control of operating systems 1918, 1932 executed in RAM 1912, 1928 by the CPUs 1904, 1940. The server storage device 1906 stores program files 1908 and the operating system 110. Similarly, the user storage devices 134 store the inter/intranet browser software 1936 and the operating systems 1938. Typically, the user would utilize the inventory location software/user interface 1942 on their mobile device 1924. In some such exemplary embodiments this system may involve an application which may process a variety of functions including but not limited to vocal commands, language translation, responses, ordering of replacement parts, scheduling dentist appointments, or letting a user know how well they or any family members in their home network database or in competition with them on a cloud database are performing functions including but not limited to cleaning their teeth or replacing their brush components.

Figure 20:
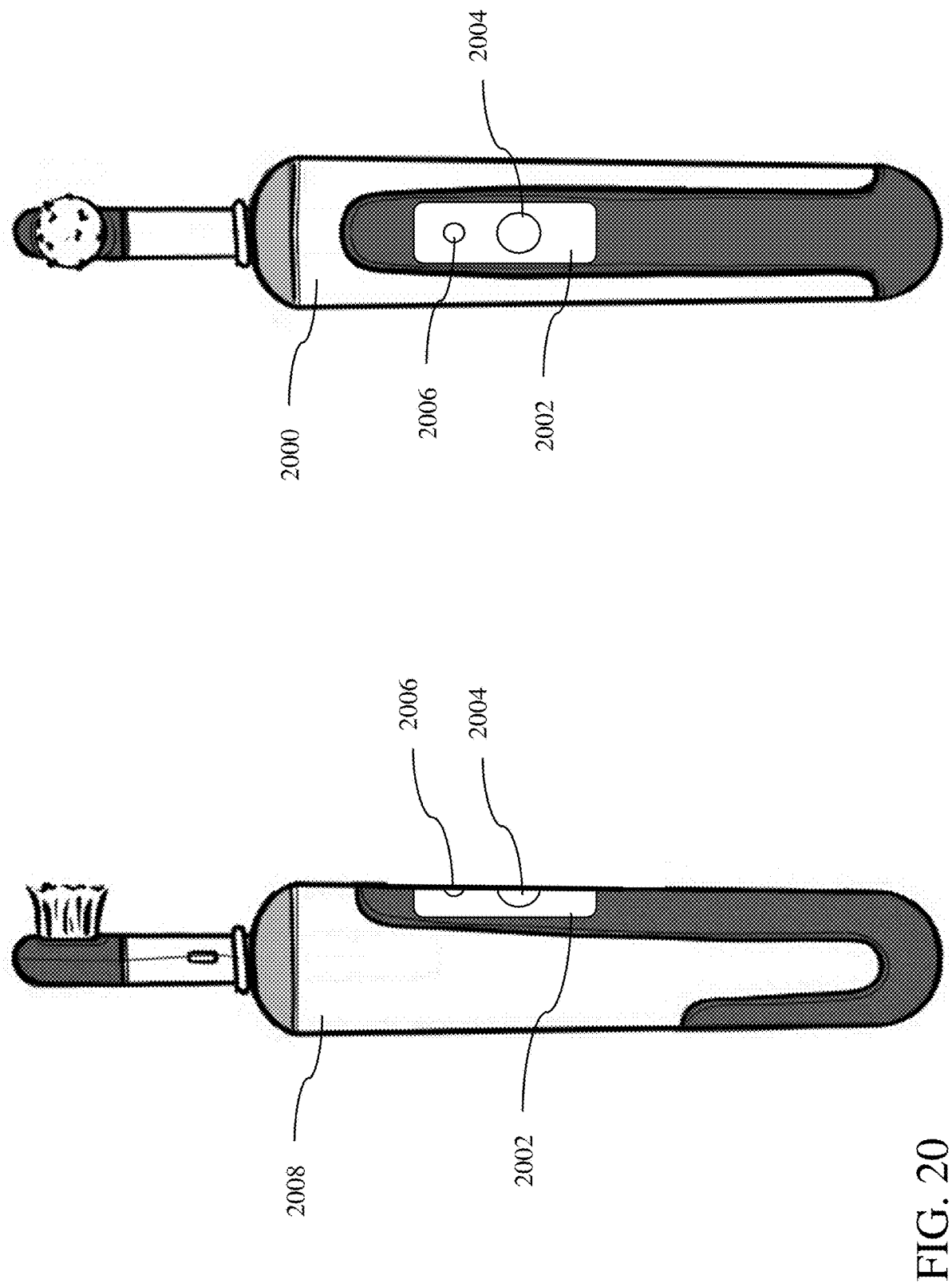
FIG. 20 is a front and side representation of an oral device—in this case an electric toothbrush where motion detected by sensors including but not limited to cameras or IMUs can activate the brush or triggers a specific oscillation motion.

FIG. 20 is a 2000 front and 2008 side representation of an oral device regulated by an oscillation mechanism, with sensor mounting faceplate 2002, on which sensors such as cameras 2004 or flash devices 2006 may be mounted. In some such embodiments an electric toothbrush may detect motion utilizing sensors including but not limited to cameras or IMUs on the brush, which can activate the brush or triggers a specific oscillation motion.

Figure 21:
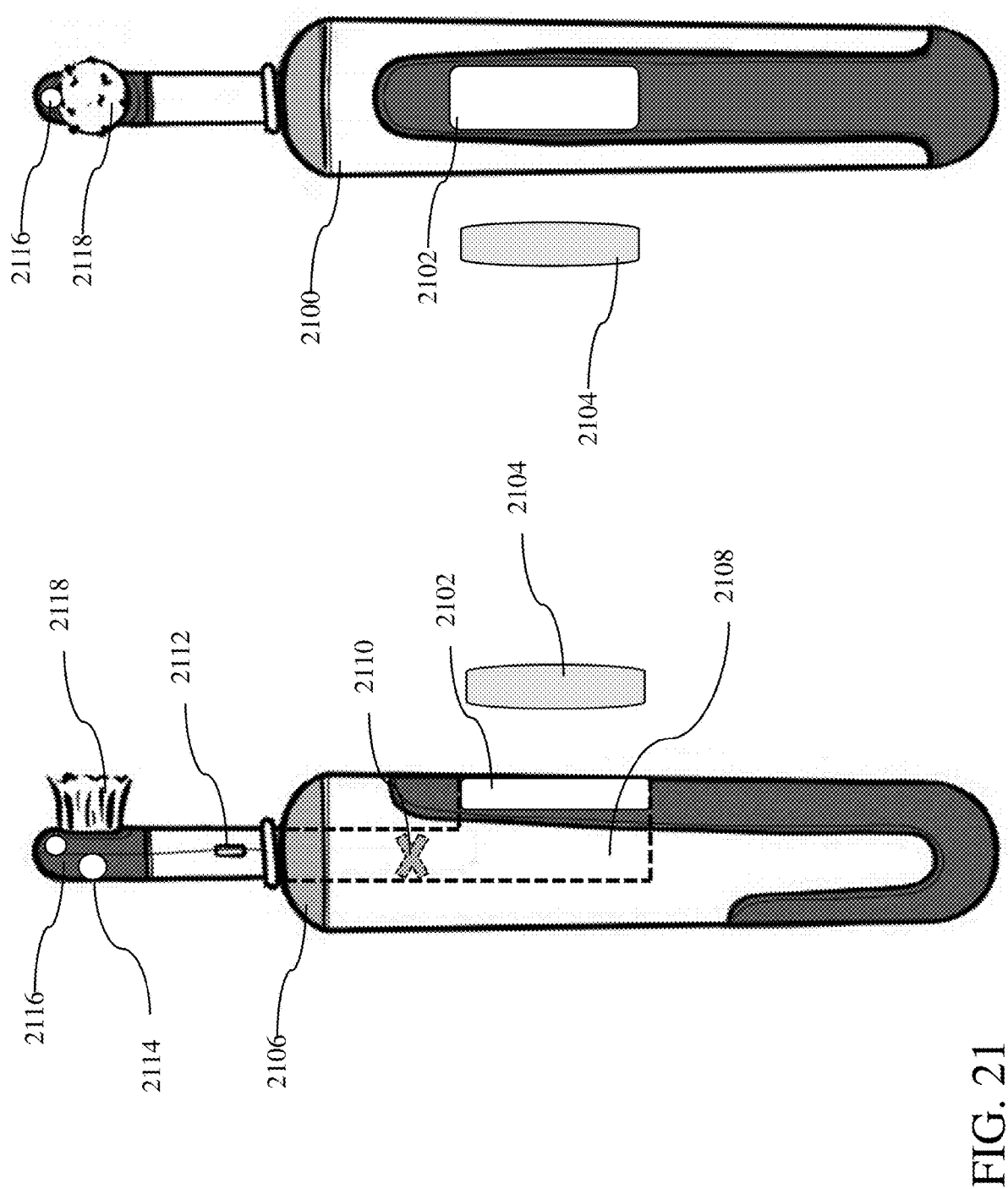
FIG. 21 is a front and side representation of an oral device—in this case an electric toothbrush where one or more toothpaste cartridges can be inserted into the unit for cleaner more efficient brushing.

FIG. 21 is a front 2100 and side (cross-sectional) 2106 exemplary embodiment of an oral device regulated by an oscillation mechanism, where toothpaste cartridges 2104 may be inserted through an orifice 2102, then fed up towards the motorized brush 2118, in some such embodiments passing through a grinder 2110 and liquid syphon or filter 2112. In some such embodiments an electric toothbrush may utilize sensors including but not limited to thermocouples 2114, pressure sensors, blood sensors (with the ability to detect bleeding gums), glucose sensors, biomarker sensors or IMUs 2118 on the brush-head.

Figure 22:
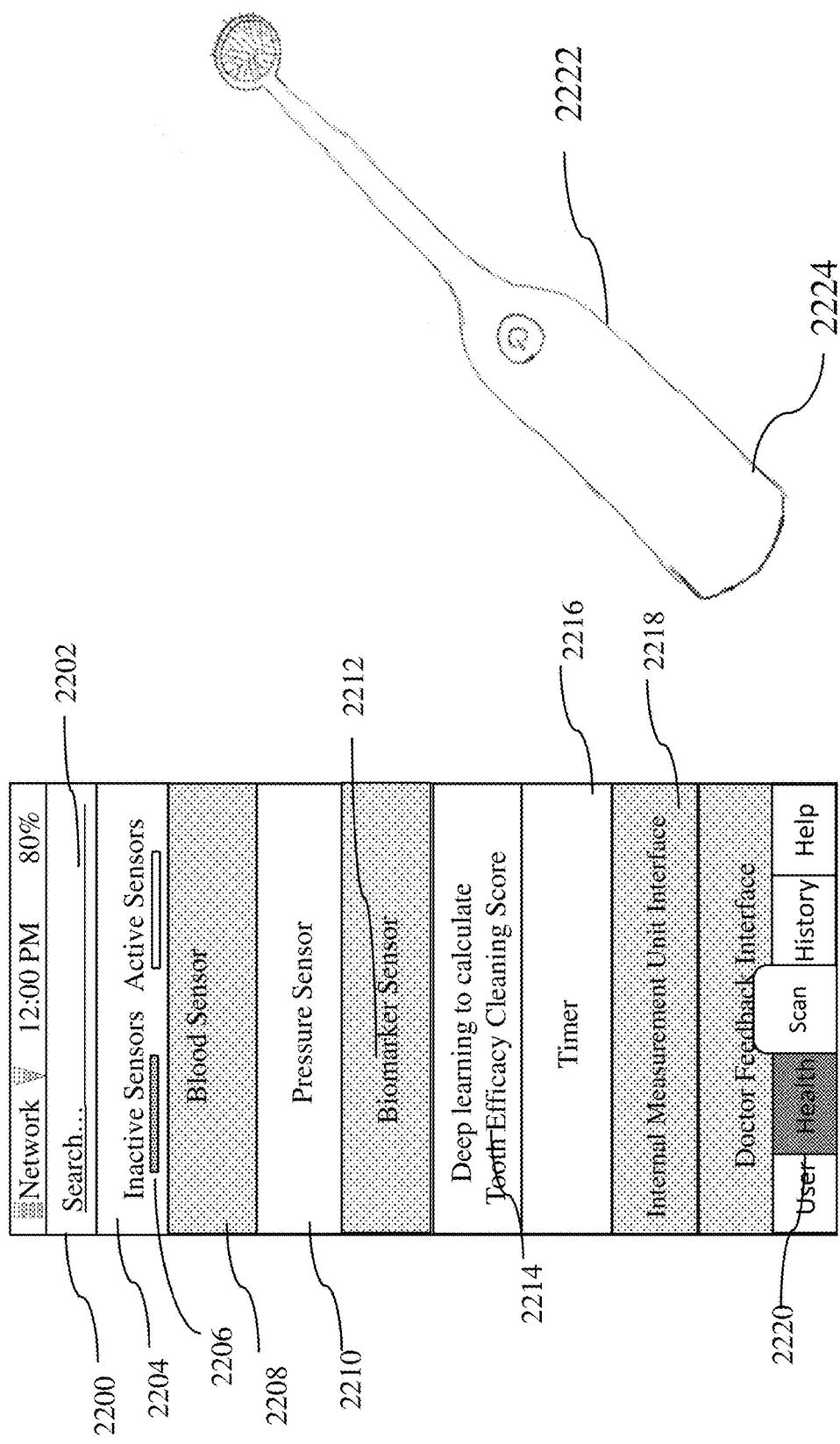
FIG. 22 shows a line drawing of a motorized toothbrush, fitted with one or more sensors, one or more of which may interface with and/or be controlled by a GUI interface.

FIG. 22 is an exemplary embodiment of a motorized toothbrush 2222, fitted with one or more sensors 2224, one or more of which may interface with and/or be controlled by a GUI interface 2200 which may allow a user to search for additional sensors to add, highlight 2206 and/or allow a user to select which sensors are active or inactive 2204. In some embodiments a user may be able to see if certain sensors are active and/or connect them, including but not limited a blood sensor 2208 which may detect how much a user's gums are bleeding, pressure sensor 2210 to detect how hard a user is brushing, a biomarker sensor 2212 to detect the presence of certain biomarkers which may indicate a change in calibration or the onset of certain health issues, certain higher functions such as a deep learning algorithm to calculate a user's TEC score 2214, a timer 2216 to determine how long a user has been brushing, an IMU interface 2218 and a doctor feedback interface. In this exemplary embodiment there are also options to change the menu on the GUI as the mode 2220 Health is currently selected in the illustration.

Figure 23:
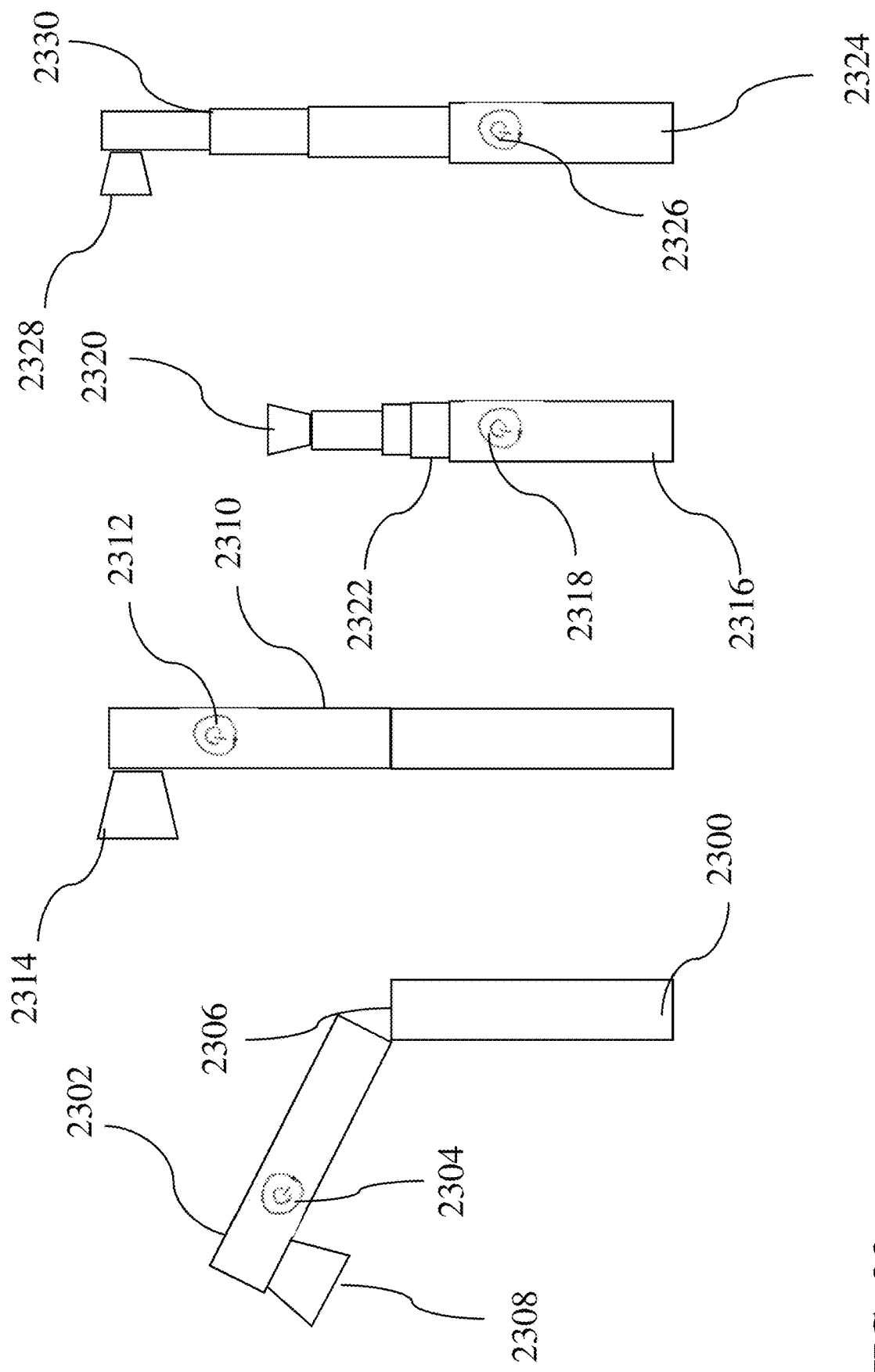
FIG. 23 is a side representation of an oral device—in this case a travel, take-to-work, electric tooth-brush, which includes a compact design, which may be compressible by means including but not limited to a foldable joint or a telescoping design, such that it could more easily fit into a small compartment.

FIG. 23 is a side representation of an oral device—in this case a travel, take-to-work, electric tooth-brush 2300, 2316, 2310, 2324 which includes a compact design, which may be compressible by means including but not limited to a foldable joint 2306 or a telescoping design 2322, such that it could more easily fit into a small compartment. Some exemplary embodiments may include but are not limited to features such as a button 2304, 2312, 2318, 2326 to activate the motorized brush 2308, 2314, 2320, 2328 folding ability 2302, 2310 or telescoping ability 2330.

Figure 24:
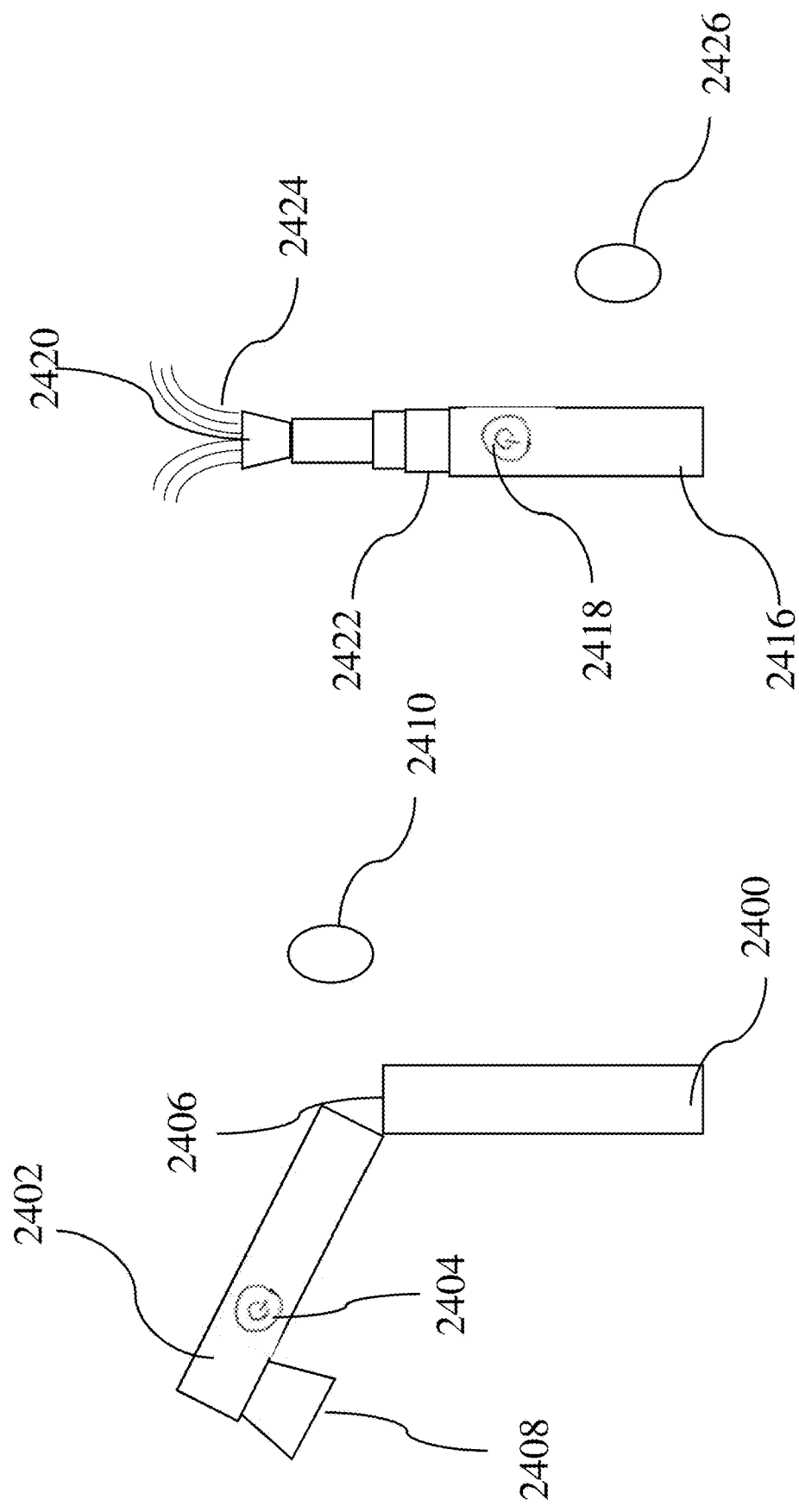
FIG. 24 is a side representation of an oral device—in this case a travel, take-to-work, electric tooth-brush, which includes a compact design, which may be compressible by means including but not limited to a foldable joint or a telescoping design, such that it could more easily fit into a small compartment, and further contains an orifice for inserting one or more toothpaste cartridges for cleaner more efficient brushing.

FIG. 24 is a side representation of an oral device—in this case a travel, take-to-work, electric tooth-brush, 2400, 2416 which includes a compact design, which may be compressible by means including but not limited to a foldable joint 2406 or a telescoping design, 2422 such that it could more easily fit into a small compartment, and further contains an orifice 2406, 2416 for inserting one or more toothpaste cartridges 2410, 2426, which may release liquid 2424 from the brush head 2420, 2408, while the motorized brush is activated by depressing the on button 2404, 2418 for cleaner more efficient brushing.

Figure 25:
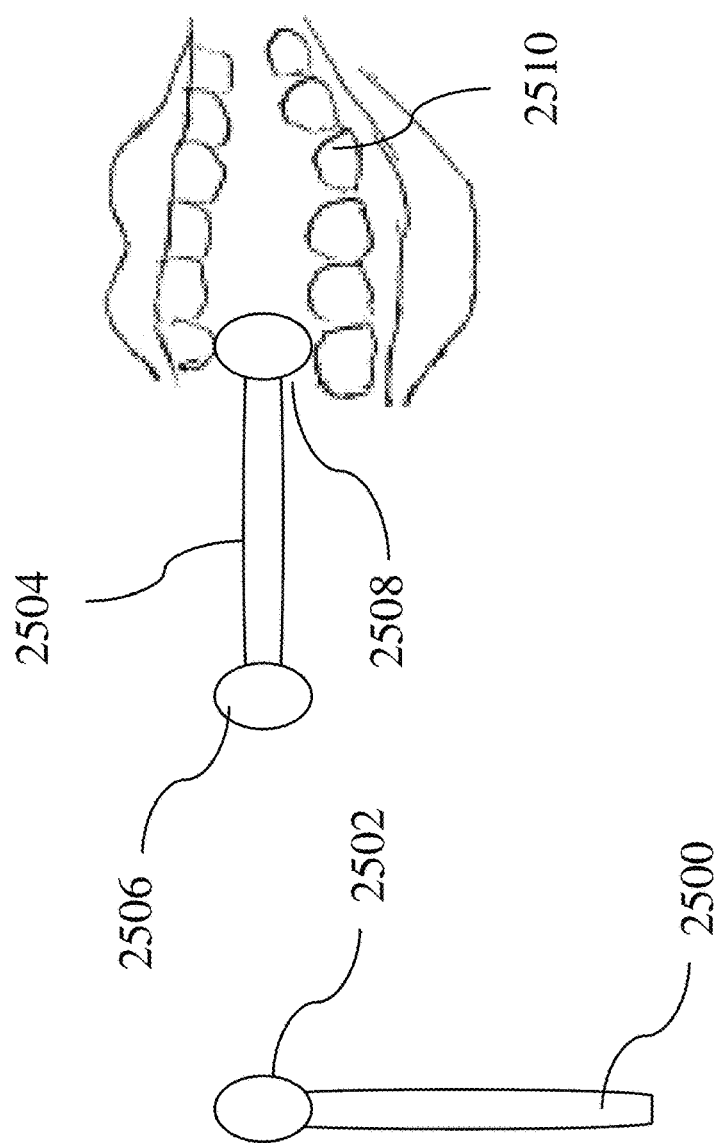
FIG. 25 is a drawing of a q-tip style toothbrush were one or more ends may be fitted with a toothpaste cartridge or gel, which may turn to a liquid or paste once bitten or inserted in a user's mouth.

FIG. 25 is a drawing of a q-tip style toothbrush 2500, 2504 were one or more ends 2502, 2506, 2508 may be fitted with a toothpaste cartridge or gel, which may turn to a liquid or paste once bitten or inserted in a user's mouth 2410.

Figure 26:
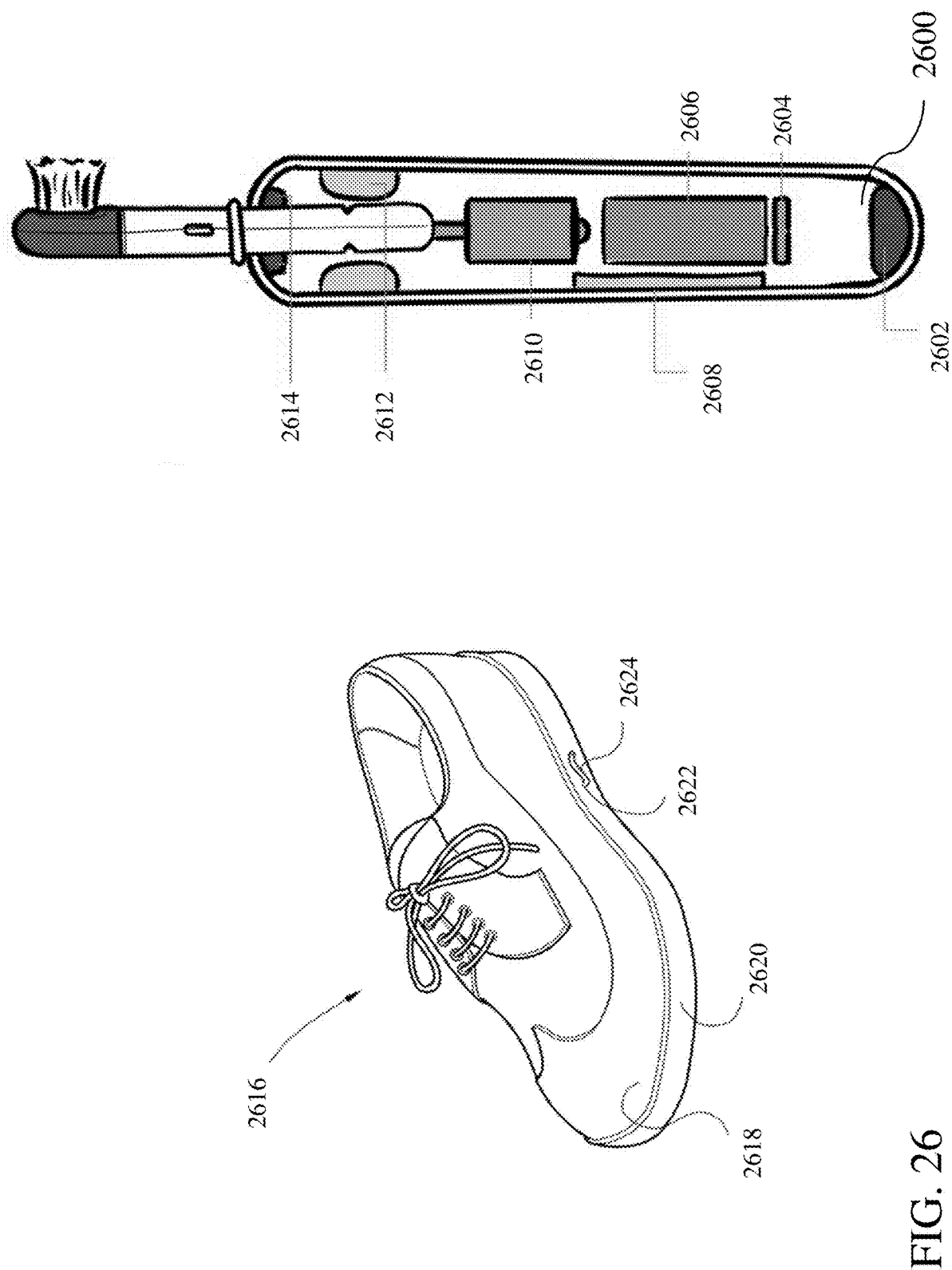
FIG. 26 is an orthogonal and a cross sectional representation of a sensor driven shoe and an oral device both respectively fitted with health monitoring sensors including but not limited to IMUs, dampeners, bluetooth and various other features.

FIG. 26 is an orthogonal and a cross sectional representation of a sensor driven shoe 2616 and an oral device 2600 both respectively fitted with health monitoring sensors including but not limited to IMUs, dampeners, bluetooth and various other features. The toothbrush 2600 may be outfitted with sensors including but not limited to IMUs 2602, Bluetooth components 2604 for communication, a battery 2606 for powering the device, a charging module 2608 for charging the device, an oscillator 2610 for regulating the motion of the stem, dampers 2612 for reducing the force placed on the stem, or additional sensors related to the movement of the brush head 2614. The shoe 2616 may include additional sensors such as an IMU 2618, pressure sensor 2620, gyroscope 2622 and/or wireless connectivity 2624

Figure 27:
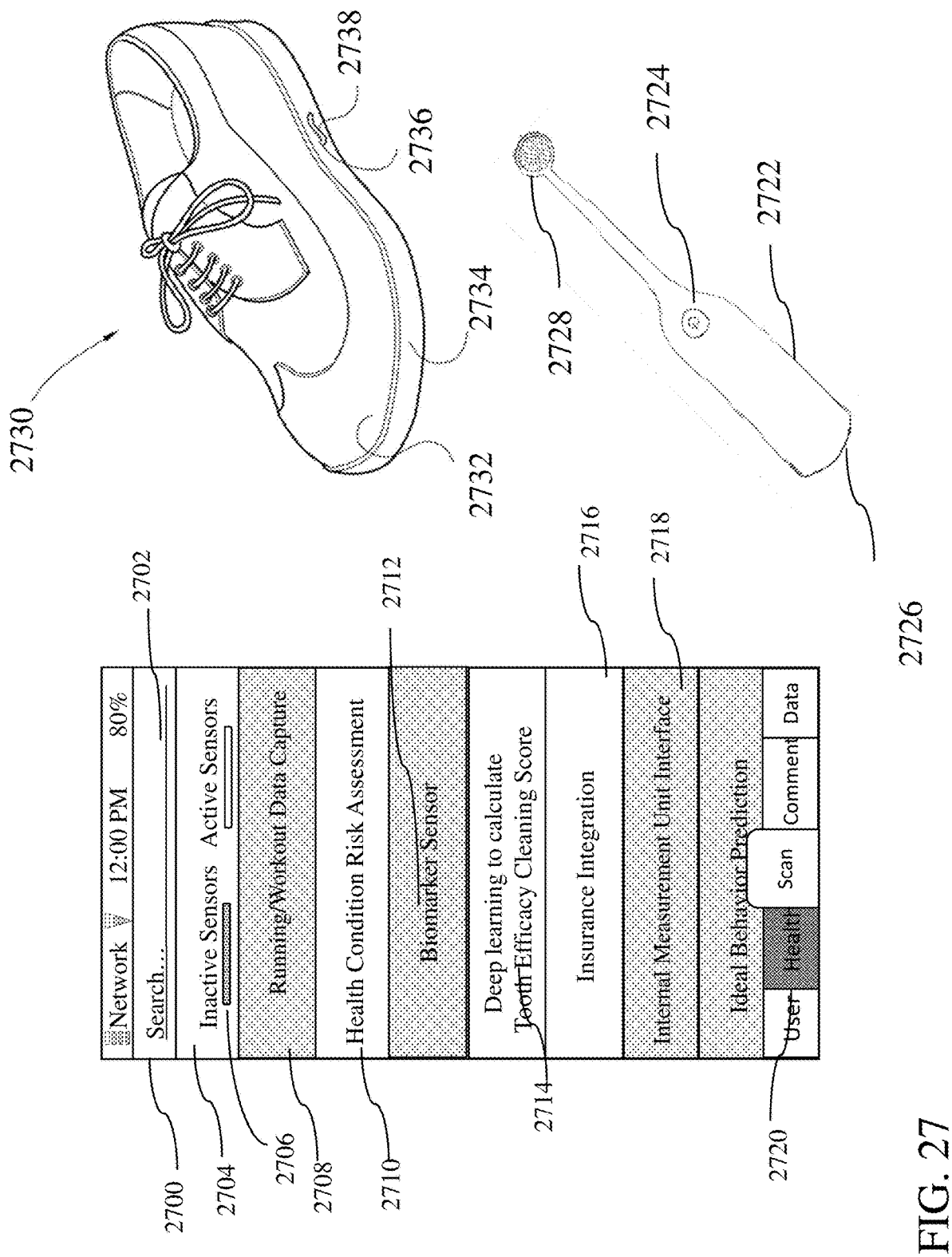
FIG. 27 is an orthogonal and a cross sectional representation of a sensor driven shoe and an oral device both respectively fitted with health monitoring sensors including but not limited to IMUs, dampeners, bluetooth and various other features, which may interface with and/or be controlled by a health-related GUI interface.

FIG. 27 is an FIG. 27 is an exemplary embodiment of a motorized toothbrush 2722, fitted with one or more sensors 2724, one or more of which may interface with and/or be controlled by a GUI interface 2700 which may allow a user to search for additional sensors to add, highlight 2706 and/or allow a user to select which sensors are active or inactive 2704. In some embodiments a user may be able to see if certain sensors are active and/or connect them, including but not limited a running or workout data capture sensor 2708 which may detect how a user is moving based on their clothing movement (in this case a shoe), a health condition risk assessment sensor 2710 to detect any risk based on the user or asset health, a biomarker sensor 2712 to detect the presence of certain biomarkers which may indicate a change in calibration or the onset of certain health issues, certain higher functions such as a deep learning algorithm to calculate a user's TEC score 2714, integration with the user's insurance 2716 to determine whether or not the user is eligible for new/replacement products through their insurance, an IMU interface 2718 and an ideal behavior prediction interface. In this exemplary embodiment there are also options to change the menu on the GUI as the mode 2720 Health is currently selected in the illustration. Orthogonal representations of a sensor driven shoe 2730 are provided with health IMUs 2732, dampeners 2734, bluetooth 2736 and various other features 2738, which may interface with and/or be controlled by a health-related GUI interface.

In some exemplary embodiments of the present disclosure companion software capable of accessing data and adding comments, and quantitative evaluations through GUI may be integrated.

In other exemplary embodiments capturing running data, workout data, health data, dental data, joining it with insurance data to predict ideal health behavior and/or risk for certain conditions is part of the design of the system.

Some embodiments of the present disclosure may involve apparatus, methods, or systems for machine learning comprising sensors including but not limited to weight, pressure, battery life measurement or magnetic field sensors, which transmit data to one or more computers which may perform functions including but not limited to interfacing with the internet or a network of similar computer devices, comparing and contrasting past data from the one or more sensors, or make assessments based on internal data prerecorded or uploaded via direct means such as usb or other physical media, to determine, learn and/or make adjustments including but not limited to the type of object that has been placed on it, the ideal magnetic field to apply, the adjustments to charging that should be made to optimally support battery life, the amount of pressure to apply for brushing based on a particular users past practices where the apparatus is a brush with a magnetic field, how to spot diseases such as those involving tooth decay or particular issues such as imbalance in a vehicle based on the angle it levitates at, or what angle to spin an object in based on sensory information including but not limited to applause data, the location of the audience or the particular object being levitated. In some such embodiments a force dampening mechanism may be incorporated, or additional sensory feedback can be applied including but not limited to visual (such as lights or displayed data), audio (such as beeps or the device making statements or sending signals to another device to make statements to the user), or tactile (such as vibrating or gyroscopic disengagement), to notify one or more users or provide feedback related to a force dampened toothbrush which may utilize such a pad.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

Having thus described our invention, we claim:

1. An oral-hygiene device and holder comprising:
   a) a stem affixed to an oscillator,
   b) one or more dampers around a section of the stem,
   c) one or more magnets on the oral hygiene device, allowing the holder to direct the oral hygiene device, or a screw in mechanism allowing the oral hygiene device to be screwed into the holder, one of the two having a male connection component and the other a female,
   d) a magnetic field mechanism adjuster,
   e) one or more sensors,
   f) one or more response mechanisms, wherein the oral-hygiene device is a brush configured to be attached to or levitated from the holder at a magnetic linkage, and the brush comprises a magnetic attachment matched on the brush and a magnetic assembly allowing for force dampening as user cleans their teeth, wherein an additional sensory feedback is applied including, but not limited to, visual, audio, or tactile, to notify one or more users or provide feedback related to the force dampening on the brush, wherein the oral hygiene device comprises an electromagnetically interfaced application which displays data transmitted from the electromagnetic communication device and interpreted by the application, the electromagnetically interfaced application comprises a tooth efficacy clean AI algorithm and machine learning.

2. The oral-hygiene device of claim 1 further comprising:
   a) a charging module,
   b) one or more batteries,
   c) a charging station compatible battery,
   d) a magnet on the oral-hygiene device allowing the holder to direct the oral-hygiene device, and a screw in mechanism allowing the instrument to be screwed into the holder, one of the two having a male connection component and the other a female,
   or
   e) wherein one or more of the magnets may rest on or about a brush holder comprising one or more electromagnets with an opposing charge to said brush magnets.

3. The oral-hygiene device of claim 2 further comprising:
   a) a web enabled device that transmits or records data associated with usage,
   b) one or more sensors on or about the brush head
   c) an electromagnetic communication device
   d) a brush head with the ability to move 360 degrees.

4. The oral-hygiene device of claim 3 further comprising: one or more pressure regulation devices.

5. The oral-hygiene device of claim 4 further comprising: a charging compatible battery.

6. The oral-hygiene device of claim 3 wherein one or more of said sensors is a temperature monitoring device, force detection sensor, camera device and/or timer.

7. The oral-hygiene device of claim 6 further comprising: a charging-port.

8. The oral-hygiene device of claim 1 further comprising
a) a deep learning algorithm
b) an interface to connect with a trained professional.

9. The oral-hygiene device of claim 8 further comprising
a) a compressible motorized brush.

10. An oral-hygiene device and holder comprising:
a) a stem affixed to an oscillator,
b) one or more dampers around a section of the stem,
c) one or more magnets on the oral-hygiene device allowing the holder to direct the oral-hygiene device, and a screw in mechanism allowing the oral hygiene device to be screwed into the holder, one of the two having a male connection component and the other a female,
d) a magnetic field mechanism adjuster,
e) one or more sensors,
f) one or more response mechanisms, wherein the oral-hygiene device further comprises:
    i) one or more fluid spraying nozzles,
    ii) one or more fluid-holding chambers,
    iii) any number of fluid tank holders, and
    iv) a cpu which interfaces with a server via a home network or internet connection, wherein said server further comprises language processing software which allows the server to respond and perform functions based on a user's verbal commands.

11. The oral-hygiene device of claim 10, further comprising a vibration pressure mechanism, wherein said cpu interfaces with a server via a home network or internet connection, wherein said server further an operating system which allows the server to guide the oral-hygiene device allowing the device to autonomously react to motion within the user's oral cavity or allowing the device to autonomously respond in adjusting the pressure regulating mechanism.

12. The oral-hygiene device of claim 10, wherein said language processing software also detects and processes information regarding the user's language, guiding the device by sending information back to the device directing the device to respond verbally to the user in the language detected.

* * * * *